United States Patent
Nakamura

(10) Patent No.: US 9,848,108 B2
(45) Date of Patent: Dec. 19, 2017

(54) IMAGE SHAKE CORRECTION DEVICE AND OPTICAL APPARATUS

(71) Applicant: RICOH IMAGING COMPANY, LTD., Tokyo (JP)

(72) Inventor: Shoji Nakamura, Tokyo (JP)

(73) Assignee: RICOH IMAGING COMPANY, LTD., Tokyo (JP)

(*) Notice: Subject to any disclaimer, the term of this patent is extended or adjusted under 35 U.S.C. 154(b) by 175 days.

(21) Appl. No.: 14/825,411

(22) Filed: Aug. 13, 2015

(65) Prior Publication Data

US 2016/0050373 A1 Feb. 18, 2016

(30) Foreign Application Priority Data

Aug. 18, 2014 (JP) ................. 2014-165916
Aug. 18, 2014 (JP) ................. 2014-165917
Aug. 18, 2014 (JP) ................. 2014-165918

(51) Int. Cl.
*H04N 5/225* (2006.01)
*H04N 5/232* (2006.01)
*G03B 5/02* (2006.01)

(52) U.S. Cl.
CPC ............ *H04N 5/2254* (2013.01); *G03B 5/02* (2013.01); *H04N 5/2328* (2013.01); *H04N 5/23258* (2013.01); *G03B 2205/0015* (2013.01); *G03B 2205/0069* (2013.01)

(58) Field of Classification Search
CPC ............ H04N 5/2254; H04N 5/23258; H04N 5/2328; H04N 5/2287; H04N 5/23287; G03B 5/00; G03B 5/02; G03B 2205/0015; G03B 2205/0069
See application file for complete search history.

(56) References Cited

U.S. PATENT DOCUMENTS

| | | | |
|---|---|---|---|
| 5,181,056 A | 1/1993 | Noguchi et al. | |
| 5,897,226 A * | 4/1999 | Okada | G03B 5/00 359/554 |
| 5,974,268 A | 10/1999 | Washisu | |
| 5,974,269 A * | 10/1999 | Sato | G03B 5/00 348/E5.046 |
| 6,718,131 B2 * | 4/2004 | Okazaki | G03B 5/00 348/E5.046 |

(Continued)

FOREIGN PATENT DOCUMENTS

| | | |
|---|---|---|
| JP | 04-34513 | 2/1992 |
| JP | 04-34514 | 2/1992 |

(Continued)

*Primary Examiner* — Luong T Nguyen
(74) *Attorney, Agent, or Firm* — Greenblum & Bernstein, P.L.C.

(57) ABSTRACT

An image shake correction device, comprising: an image correction unit configured to correct image shake by moving with respect to an optical axis; and a locking ring provided rotatably about the optical axis. In this configuration, the image correction unit comprises at least one locked projection formed to protrude in an optical axis direction, the locking ring comprises at least one locking projection formed to protrude in the optical axis direction, and at a predetermined rotational position of the locking ring, the at least one locking projection contacts the at least one locked projection and thereby locks the image correction unit.

19 Claims, 17 Drawing Sheets

(56) References Cited

U.S. PATENT DOCUMENTS

| | | | |
|---|---|---|---|
| 7,149,419 B2* | 12/2006 | Akada | G02B 27/646 |
| | | | 396/55 |
| 2008/0181594 A1 | 7/2008 | Noguchi | |
| 2009/0185273 A1* | 7/2009 | Sato | G03B 5/00 |
| | | | 359/554 |

FOREIGN PATENT DOCUMENTS

| | | |
|---|---|---|
| JP | 04-328532 | 11/1992 |
| JP | 07-294994 | 11/1995 |
| JP | 08-211436 | 8/1996 |
| JP | 10-026782 | 1/1998 |
| JP | 10-197911 | 7/1998 |
| JP | 11-212134 | 8/1999 |
| JP | 2006-349803 | 12/2006 |
| JP | 2007-025164 | 2/2007 |
| JP | 2008-185643 | 8/2008 |

* cited by examiner

IMAGE SHAKE CORRECTION DEVICE AND OPTICAL APPARATUS

BACKGROUND OF THE INVENTION

The present invention relates to an image shake correction device and an optical apparatus for correcting image shake caused during photographing by camera shake.

Recently, many types of optical apparatuses, such as a lens barrel and a camera, are provided with an image shake correction device for correcting image shake caused by camera shake. One of such an image correction device is configured such that a part of a lens system provided in a lens barrel is formed as a correction optical system, camera shake caused in the lens barrel during photographing is detected, and the correction optical system is driven and decentered to cancel the detected camera shake. However, such a correction optical system tends to be moved and decentered by an external force applied to the lens barrel, and in this case the correction optical system may be damaged by contacting or colliding with a fixed part of the lens barrel.

In order to prevent occurrence of such damage of the correction optical system, a locking mechanism for holding the correction optical system in a fixed state with respect to the fixed part is described, for example, in Japanese Patent Provisional Publications No. H10-26782A (hereafter, referred to as patent document 1) and No. H04-34514A (hereafter, referred to as patent document 2).

SUMMARY OF THE INVENTION

However, the locking mechanism described in patent documents 1 and 2 is configured such that, by changing a rotational position of a ring-shaped locking member disposed on an outer circumferential side of the correction optical system, an inner circumferential part of the locking member is brought to a state of contacting an outer circumferential part of the correction optical system so as to restrict the correction optical system and thereby the locked state is achieved. Therefore, the locking member needs to be formed as a ring-shaped member having a diameter lager than the correction optical system. The size of the outer diameter of the locking member hinders reduction of the diameter of the image shake correction device or the lens barrel in which the image shake correction device is incorporated. Furthermore, since a moving range of the correction optical system is determined by the interval in the radial direction between the outer circumferential part of the correction optical system and the inner circumferential part of the locking member, if the locking member is designed to have a small diameter, the moving range of the correction optical system may be restricted by the locking member, which may hamper appropriate operation of the image shake correction.

The present invention is advantageous in that it provides an image shake correction device and an optical apparatus which are capable of reducing a diameter of a locking member and thereby achieving downsizing and light-weighting of an image shake correction device.

According to an aspect of the invention, there is provided an image shake correction device, comprising: an image correction unit configured to correct image shake by moving with respect to an optical axis; and a locking ring provided rotatably about the optical axis. In this configuration, the image correction unit comprises at least one locked projection formed to protrude in an optical axis direction, the locking ring comprises at least one locking projection formed to protrude in the optical axis direction, and at a predetermined rotational position of the locking ring, the at least one locking projection contacts the at least one locked projection and thereby locks the image correction unit.

According the above described configuration, the diameter of the locking ring can be reduced sufficiently to a size for forming the locking projections, and thereby it becomes possible to reduce the diameter of the image shake correction device.

The at least one locking projection and the at least one locked projection may be disposed at a same position in the optical axis direction.

The locking ring and the image correction unit may be disposed at different positions in the optical axis direction.

When the locking ring is located at a locked position, the at least one locking projection may be moved to a position where the at least one locking projection contacts the at least one locked projection and locks the image correction unit. When the locking ring is at a lock-released position, the at least one locking projection may be moved to a position where the at least one locking projection does not contact the at least one locked projection within a movable range of the image correction unit.

The image correction unit and the locking ring may be disposed adjacent to each other in the optical axis direction. In this case, the at least one locked projection may be formed on a surface facing the locking ring to protrude toward the locking ring, and the at least one locking projection may be formed on a surface facing the image correction unit to protrude toward the image correction unit.

The image correction unit may be movable, in a plane orthogonal to the optical axis, in a first direction and a second direction which are perpendicular to each other. In this case, in a state where the at least one locking projection contacts the at least one locked receiving projection, movement of the image correction unit in the first direction and the second direction may be restricted.

The at least one locking projection may comprise a plurality of locking projections, and the at least one locked projection may comprise a plurality of locked projections. In this case, the plurality of locking projections may restrict movement of the plurality of locked projections in a radial direction, and movement of the image correction unit in the first direction and the second direction may be restricted by the plurality of locking projections.

The plurality of locked projections may be disposed at positions in a circumferential direction along a virtual circle centered at the optical axis. The plurality of locking projections may be formed as partial walls distributed in the circumferential direction along the virtual circle.

The plurality of locking projections may be four locking projections and the plurality of locked projections may be four locked projections. In this case, the four locking projections and the four locked projections may be disposed at four positions in the circumferential direction in a plane orthogonal to the optical axis such that lines each of which connecting two of the four locking projections perpendicularly intersect with each other.

The image shake correction device may further comprise: a driving unit configured to drive and rotate the locking ring; and a position detection unit configured to detect a rotational position of the locking ring. In this configuration, the rotational position of the locking ring may be controlled based on the rotational position detected by the position detection unit.

The image shake correction device may further comprise: an actuator configured to move the image correction unit;

and a guide member configured to guide movement of the image correction unit. In this configuration, the actuator and the guide member may be disposed to sandwich the image correction unit in the optical axis direction, and the actuator and the guide member may be disposed to overlap with each other when viewed in the optical axis direction.

The image correction unit may be configured to be movable, in a plane orthogonal to the optical axis, in a first direction and a second direction which are perpendicular to each other. In this case, the guide member may be provided with a first portion elongated in the first direction and a second portion elongated in the second direction. The guide member may be engaged with the image correction unit at the first portion to be relatively movable in the first direction with respect to the image correction unit, and may be engaged with a fixed part of the image shake correction device at the second portion to be relatively movable in the second direction with respect to the fixed part.

The guide member may include a L-shaped plate portion having a plate thickness in the optical axis direction. In this case, the guide member may be engaged with the image correction unit on one side of the plate portion in a plate thickness direction, and may be engaged with the fixed part on another side of the plate portion in the plate thickness direction.

The actuator comprises: a first actuator configured to move the image correction unit in the first direction; and a second actuator configured to move the image correction unit in the second direction. In this case, the first actuator and the second actuator may be disposed to overlap the guide member in the optical axis direction.

The image shake correction device may further comprise a magnetic actuator configured to move the image correction unit. In this configuration, the magnetic actuator may comprise a magnet and a coil. One of the magnet and the coil may be supported by the image correction unit, and the other of the magnet and the coil may be supported by a fixed part of the image shake correction device. The one of the magnet and the coil to be supported by the fixed part may be attachable to the fixed part from an outside of the image shake correction device in the optical axis direction, and may be position-adjustable in the optical axis direction with respect to the fixed part.

The image correction unit may comprise two supporting pieces formed to protrude in a same direction. In this case, the coil may be supported by the image correction unit through use of the two supporting pieces.

The magnetic actuator may comprise a first yoke and a second yoke disposed to sandwich the magnet and the coil in the optical axis direction. In this case, the first yoke may be integrally formed with the magnet.

The first yoke may be supported by the fixed part from one direction of the outside.

The magnet actuator may further comprise at least one shim disposed to intervene between the first yoke and the fixed part. In this case, by changing a plate thickness of the at least one shim or by changing a number of shims to be disposed to intervene between the first yoke and the fixed part, a positional relationship between the magnet and the coil may be changed.

According to another aspect of the invention, there is provided an optical apparatus, comprising: an optical system configured to form a subject image; and one of the above described image shake correction device.

BRIEF DESCRIPTION OF THE ACCOMPANYING DRAWINGS

FIGS. 5A and 8B illustrate a fixing configuration of an X drive magnet, in which FIG. 8B is a cross sectional view in Y-direction.

FIGS. 9A and 9B illustrate a supporting structure of an X drive coil, in which FIG. 9A is a perspective view in a supporting state, and FIG. 9B is a perspective view before the C drive coil is supported.

Figure 15A:
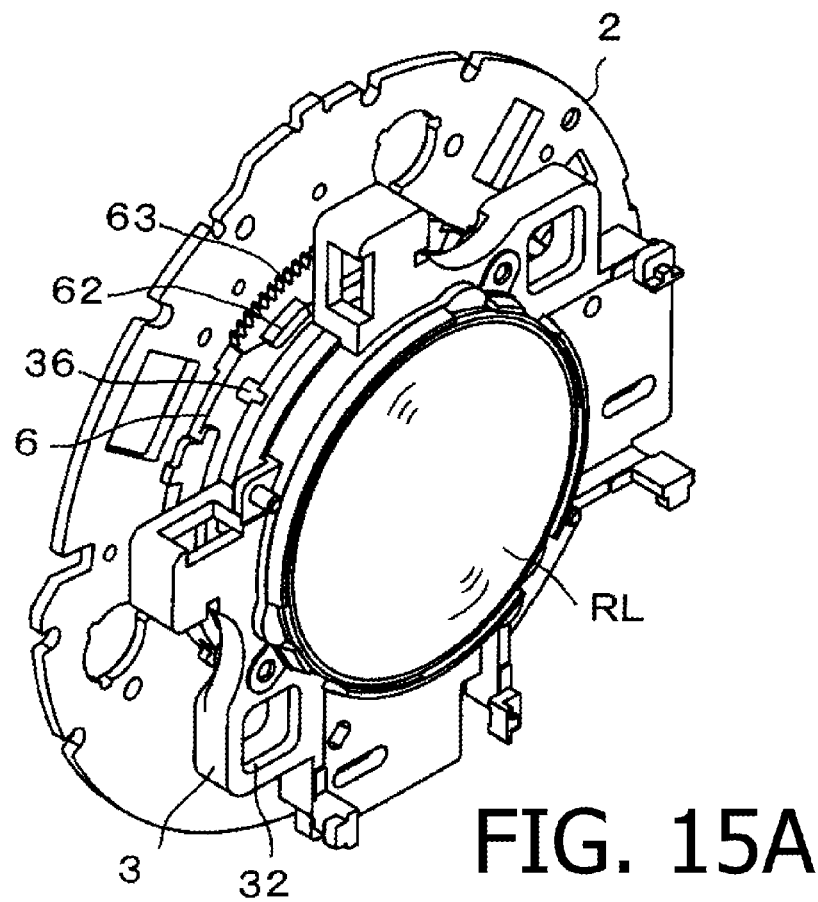
Figure 15B:
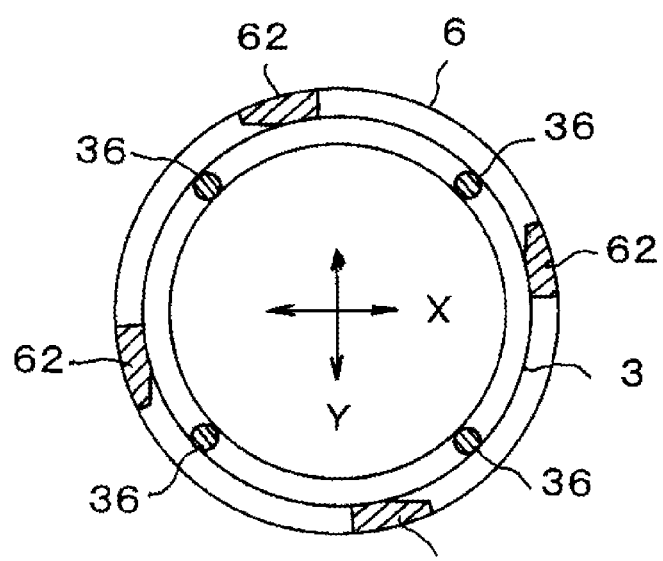

FIGS. 15A and 15B respectively illustrate a perspective view and a front view of the correction lens frame and the locking ring in a lock-released state.

Figure 16A:
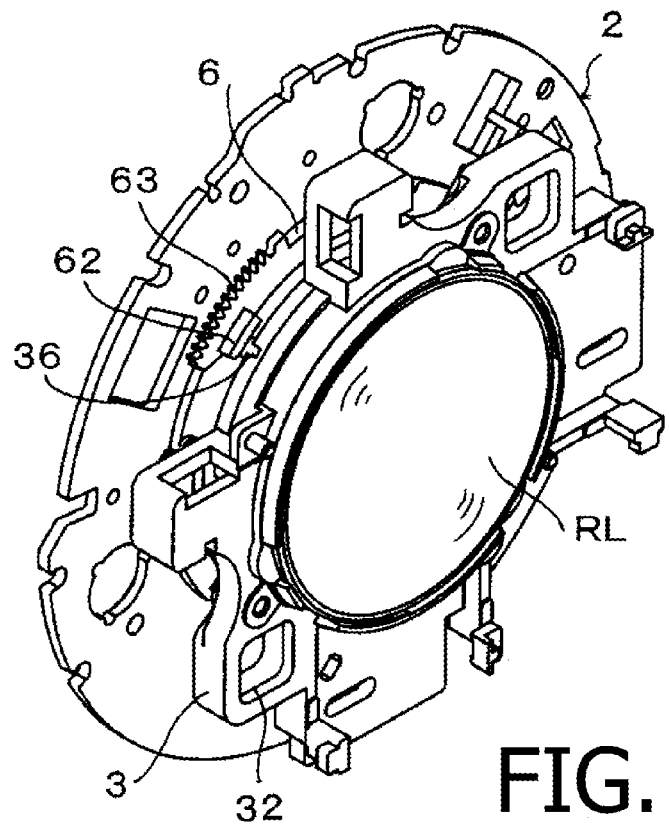
Figure 16B:
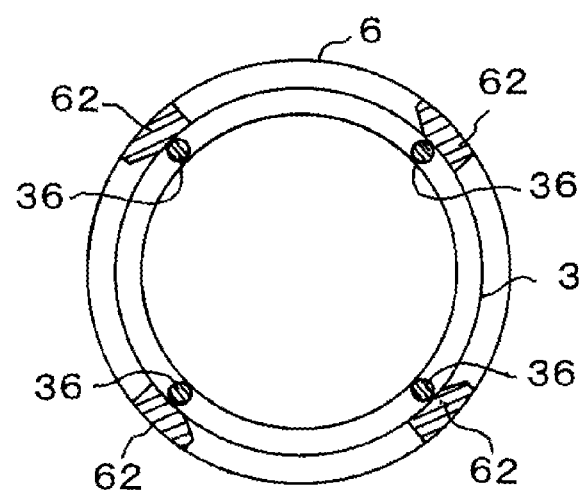

FIGS. 16A and 16B respectively illustrate a perspective view and a front view of the correction lens frame and the locking ring in a locked state.

Figure 17:
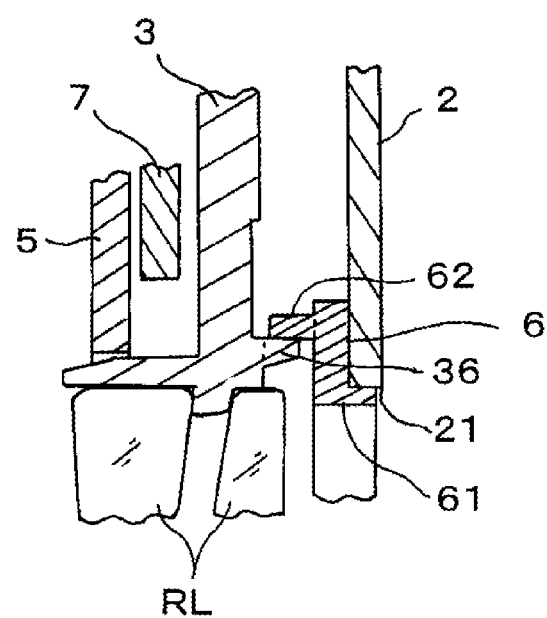

FIG. 17 is a cross sectional view for explain positions of the correction lens frame and the locking ring in the optical axis direction.

DETAILED DESCRIPTION OF THE EMBODIMENTS

Figure 1:
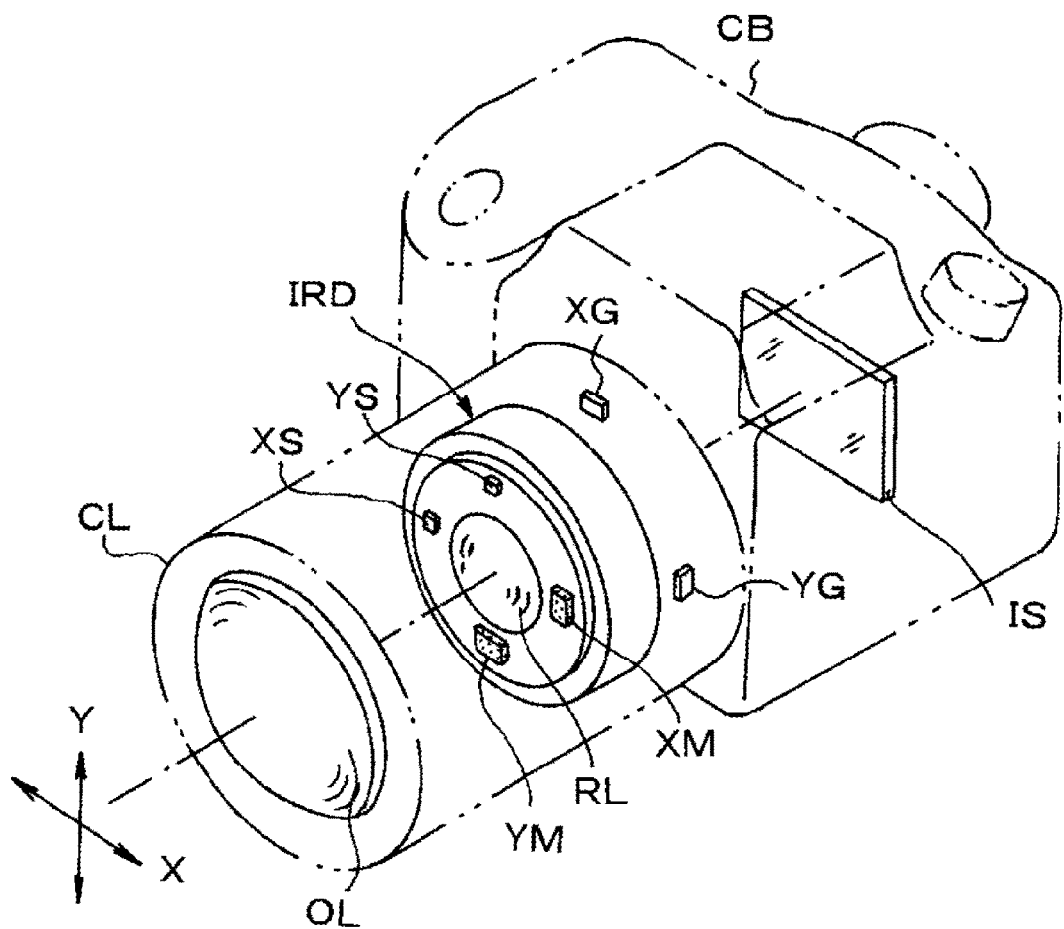
FIG. 1 is a perspective view conceptually illustrating a configuration of a camera in which an image shake correction device according to an embodiment of the invention is provided.

Hereinafter, an embodiment according to the invention is described with reference to the accompanying drawings. In the following, an image shake correction device provided in a lens barrel is described by way of example. FIG. 1 is a perspective view conceptually illustrating a configuration of a camera CAM which includes a camera body CB and a camera lens CL. The camera lens CL is a lens barrel which is integrally formed with the camera body CB or is detachably attachable to the camera body CB. In the camera body CB, an image pickup device IS for imaging a subject image formed by the lens barrel CL is provided. In the lens barrel CL, an image forming optical system OL for forming an image of a subject is provided, and an image shake correction device IRD for correcting shake of a subject image formed by the image forming optical system LL is provided.

The image shake correction device IRD is configured to cancel camera shake based on a detection signal from vibration detectors (gyro sensors) XG and YG which are provided in the lens barrel CL and detect the camera shake caused on the camera body CB or the lens barrel CL at photographing by moving a subject image in X-direction (a first direction) and Y-direction (a second direction) which are perpendicular to an optical axis direction. The X-direction is a horizontal direction of the image shake correction device and is a left and right direction in FIG. 1. The Y-direction is a vertical direction of the image shake correction device and is an up and down direction in FIG. 1. To execute such correction, the image shake correction device IRD is configured to include a correction optical system disposed on an optical path of the image forming optical system OL (i.e., a correction lens RL), X and Y magnetic actuators XM and YM each having a voice coil configuration for driving the correction lens RL in the X-direction and Y-direction, respectively, and X and Y sensors XS and YS for detecting the position of the correction lens RL in the X-direction and Y-direction.

Figure 2:
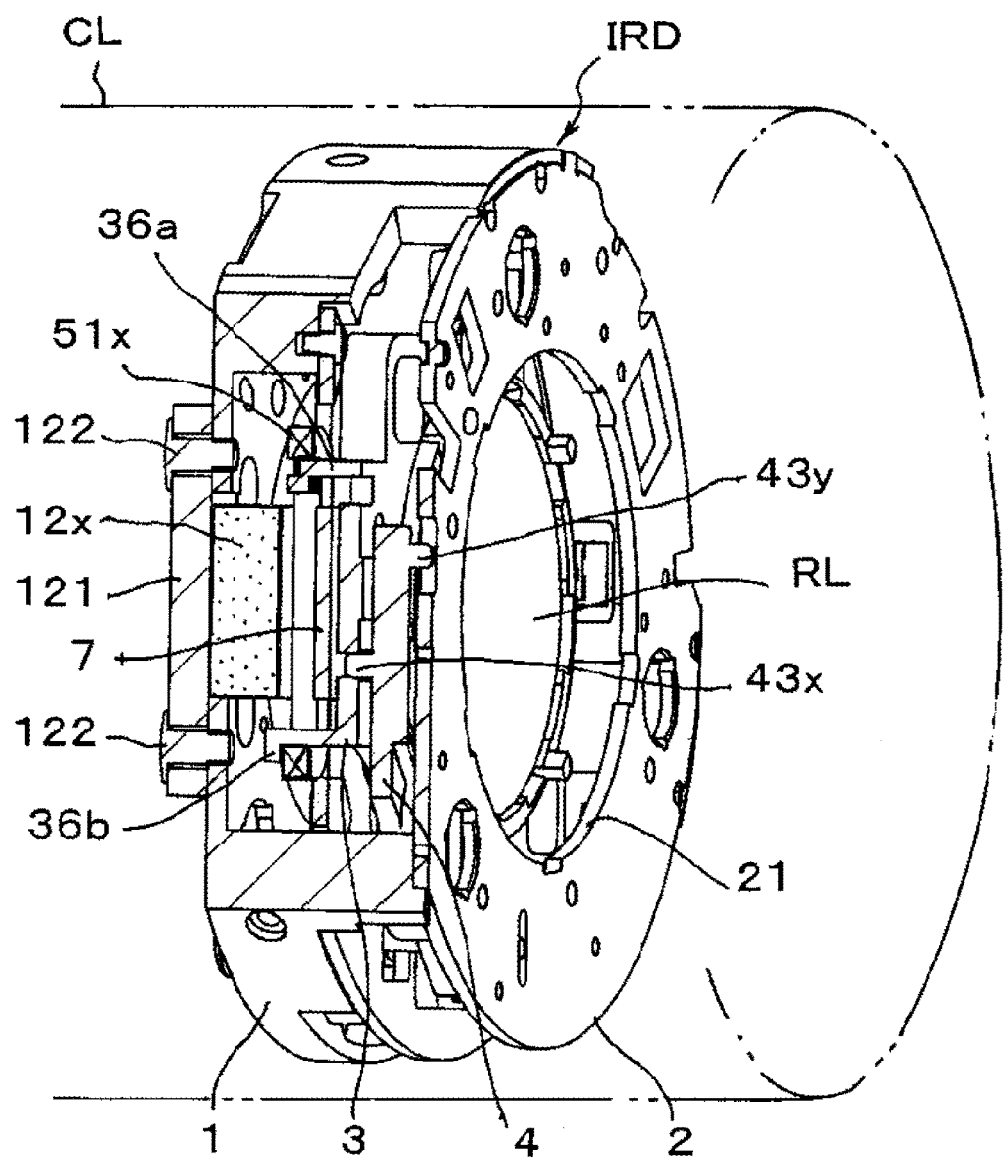
FIG. 2 is a perspective view illustrating an outer appearance of the image shake correction device in which a part of the image correction device is removed for illustration.

FIG. 2 is a perspective view illustrating an outer appearance of the image shake correction device IRD viewed from the rear side (i.e., the camera body side). In FIG. 2, a part of the image shake correction device IRD is removed for illustration. A general configuration of the image shake correction device IRD is as follows. The image shake correction device IRD includes a fixing frame 1 having a shape like a short cylinder whose peripheral wall is partially removed, and a circular plate-like base plate 2 having a center opening 21 is securely attached to the rear side of the fixing frame 1. The fixing frame 1 is fixed to the lens barrel CL shown in FIG. 1, and thus the base plate 2 is also fixed to the lens barrel CL. Between the fixing frame 1 and the base plate 2 in the optical axis direction, a correction lens frame 3 supporting the correction lens RL for correcting the camera shake is supported movably in a plane orthogonal to the optical axis, so that by movement of the correction lens frame 3, correction for the camera shake is achieved. The moving direction of the correction lens frame 3 is restricted so that the correction lens frame 3 is moved in the X-direction and Y-direction in a plane orthogonal to the optical axis by an L-shaped guide plate 4.

Figure 3:
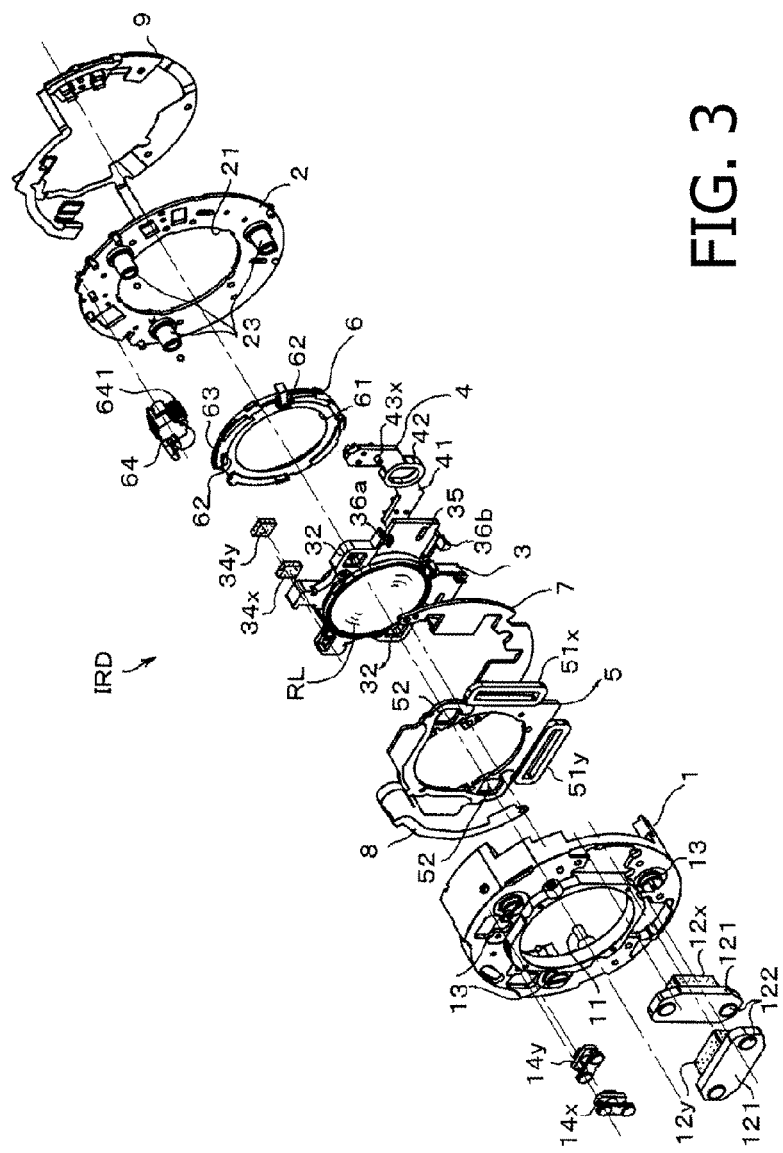
FIG. 3 is a partially exploded perspective view of the image shake correction device viewed from a subject side.

FIG. 3 is a partially exploded perspective view of the image shake correction device IRD viewed from a subject side. As shown in FIG. 3, in the mage shake correction device IRD, the X magnetic actuator XM and the Y magnetic actuator YM are provided to move the correction lens frame 3 in the X and Y directions with respect to the base plate 2. As described in detail later, the X magnetic actuator XM and the Y magnetic actuator YM are formed of an X drive magnet 12x and a Y drive magnet 12y, and an X drive coil 51x and a Y drive coil 51y provided on an intermediate plate 5 integrally supported by the correction lens frame 3.

As a guide mechanism used when the correction lens frame 3 moves in the X-direction and Y-direction, the L-shape guide plate 4 is disposed between the correction lens frame 3 and the base plate 2 in the optical axis direction. The L-shaped guide plate 4 engages with the correction lens frame 3 and the base plate 2, so that the correction lens frame 3 moves in the X-direction with respect to the L-shaped guide plate 4. Furthermore, the correction lens frame 3 is able to move integrally with the L-shaped guide plate 4 in the Y-direction with respect to the base plate 2.

Between the correction lens frame 3 and the base plate 2 in the optical axis direction, a ring-shaped a locking ring 6 having a circular center opening 61 is disposed so as to be rotatable within a required angular range about the optical axis. By changing the rotational position of the locking ring 6, movement of the correction lens frame 3 in the X-direction and Y-direction is locked or unlocked, and thereby locking or the unlocking of the image shake correction device IRD is achieved.

Detailed explanation about the above described image shake correction device IRD is given below. As shown in FIG. 2, the fixing frame 1 has a shape of a short cylinder whose central portion is opened and a peripheral wall thereof is partially removed. The base plate 2 is fixed to the rear surface of the fixing frame 1. Between the fixing frame 1 and the base plate 2 in the optical axis direction, the correction lens frame 3 is disposed to be able to move in the X and Y directions as described above. In this configuration, as shown in FIG. 3, the intermediate plate 5 having a different shape is integrally fixed to the front side of the correction lens frame 3, and thus the intermediate plate 5 is able to move integrally with the correction lens frame 3 in the X-direction and Y-direction.

Figure 4:
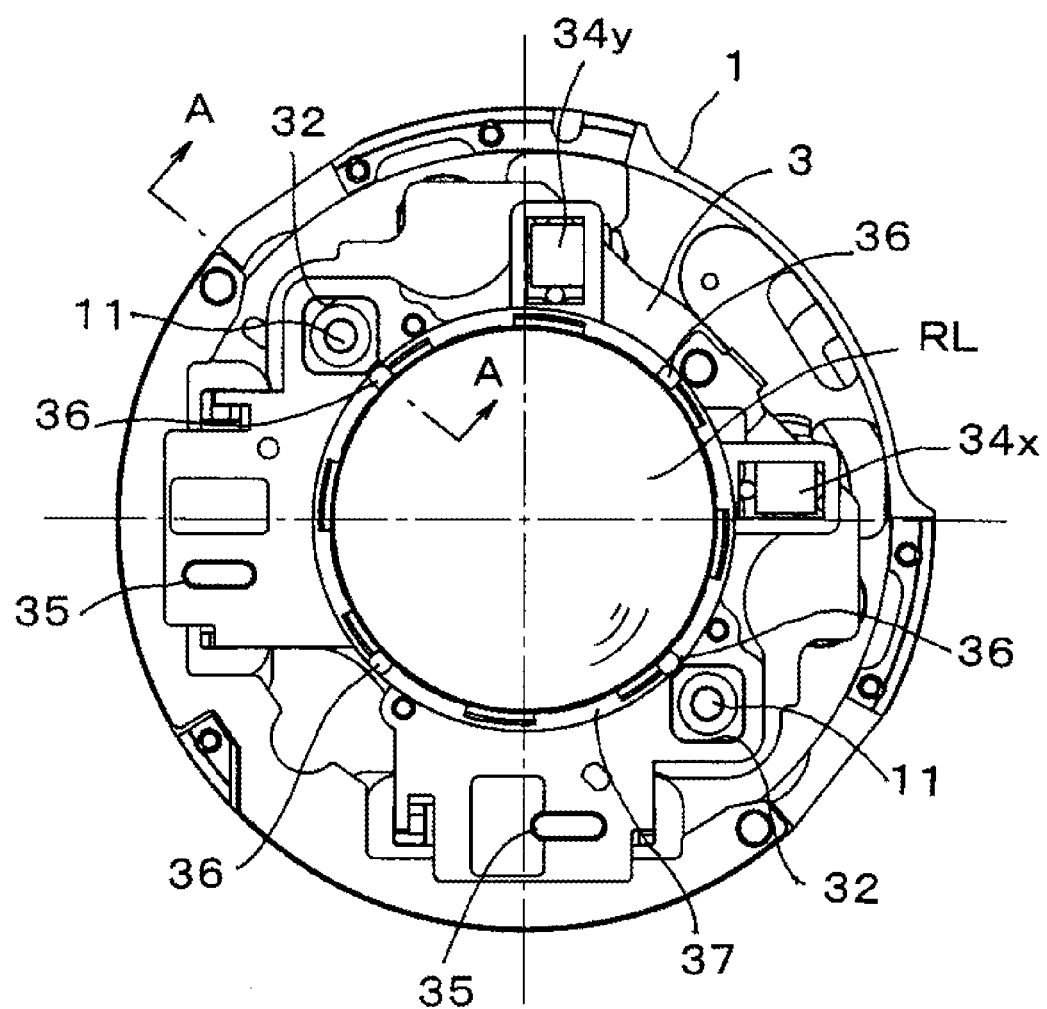
FIG. 4 is a front view illustrating a correction lens frame and a fixing frame viewed from a rear side.

FIG. 4 is a front view illustrating the correction lens frame 3 and the fixing frame 1 viewed from the rear side. Posts 11 protruding to the rear side are fixed to the fixing frame 1 at two positions in a radial direction of the rear surface of the fixing frame 1. The two posts 11 are respectively inserted into shaft holes 32 and 52 each having a rectangular shape opened in the correction lens frame 3 and the intermediate plate 5 at the two positions in the radial direction.

Figure 5A:
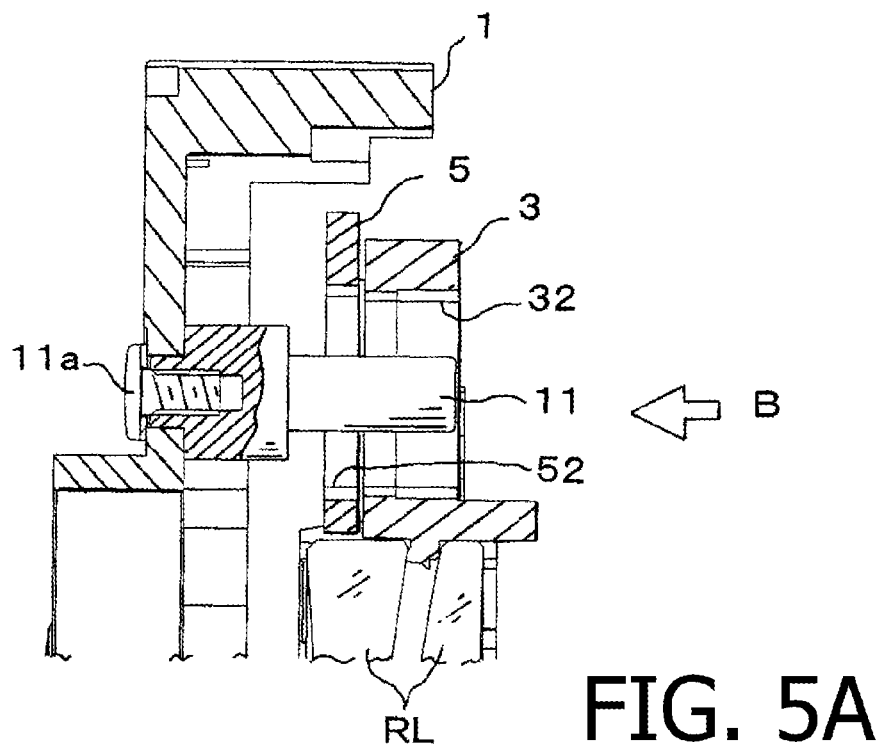
FIG. 5A is an enlarged cross sectional view along a line A-A in FIG. 4.
Figure 5B:
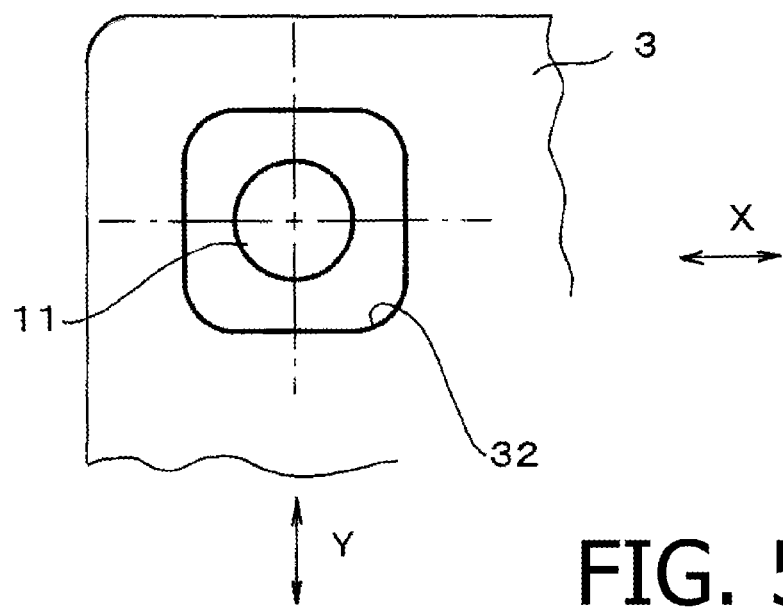
FIG. 5B is a schematic illustration viewed from a B-direction in FIG. 5A.

FIG. 5A is an enlarged cross sectional view along a line A-A in FIG. 4, and FIG. 5B is a schematic illustration viewed from a B-direction in FIG. 5A. The post 11 is formed as a cylinder boss, and a front end face of the post 11 is fixed to the fixing frame 1 by a small screw 11a. The post 11 is inserted into the shaft holes 32 and 52 respectively formed in the correction lens frame 3 and the intermediate plate 5. By the post 11, the correction lens frame 3 is supported by the fixing frame 1 and movement of the correction lens frame 3 in the X-direction and Y-direction with respect to the fixing frame 1 is allowed. Since the diameter of the post 11 is smaller than the size of each side of the shaft hole 32 of the correction lens frame 3, the correction lens frame 3 is allowed to move in the X-direction and Y-direction by a length corresponding to a difference in size between the post 11 and the shaft hole 32. In other words, the maximum movement amount of the correction lens frame 3 in the X-direction and Y-direction is restricted by the post 11 and the shaft hole 32.

Figure 6:
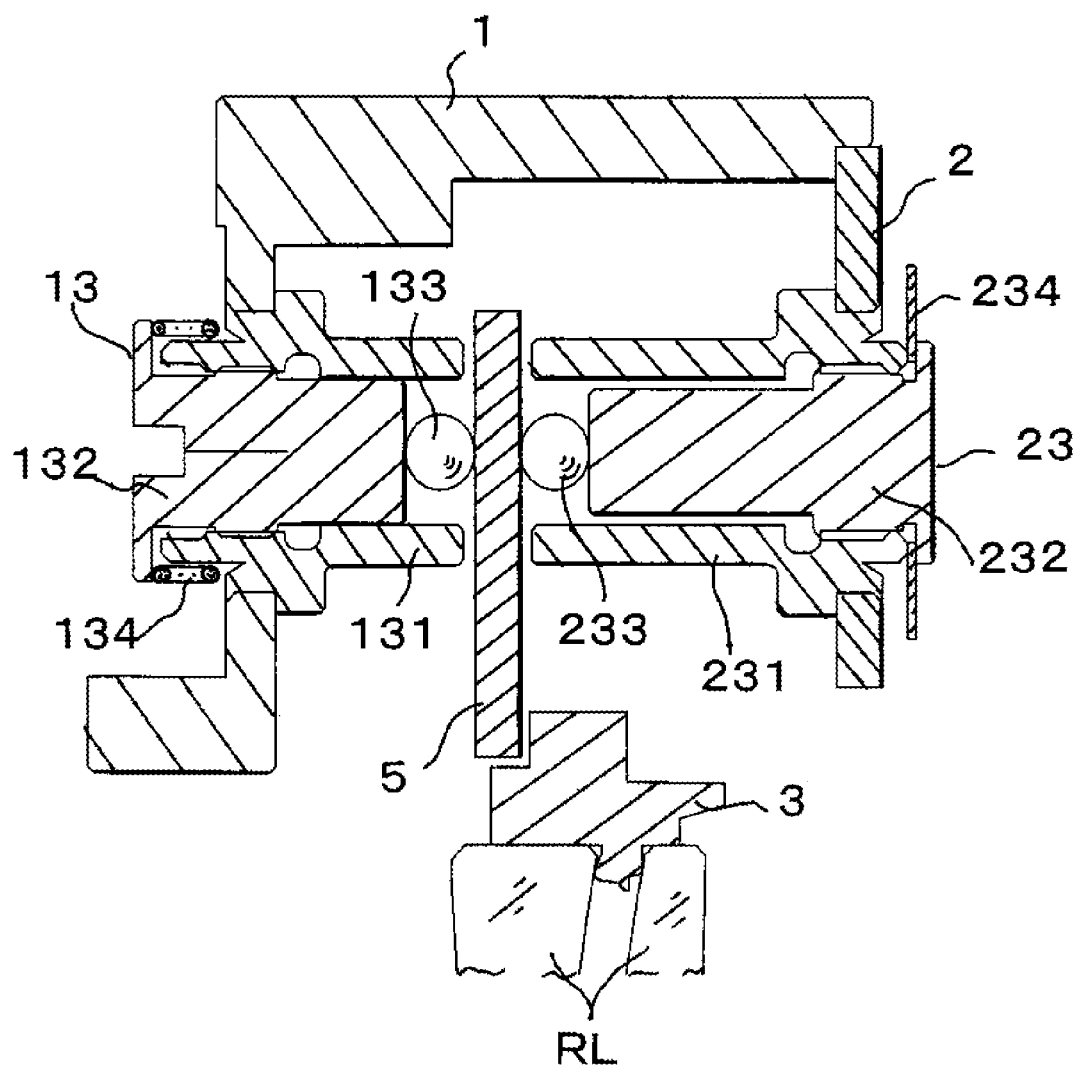
FIG. 6 is a cross sectional view of a ball retainer in an optical axis direction.

Ball retainers 13 and 23 are respectively disposed on the fixing frame 1 and the base plate 2 at positions arranged along the circumferential direction, and, by the ball retainers 13 and 23, the intermediate plate 5 is sandwiched in the optical direction between the fixing frame 1 and the base plate 2. FIG. 6 is a cross sectional view of the ball retainers 13 and 23 in the optical axis direction. A front set collar 131 is swaged into the fixing frame 1 from the front side, and a front set screw 132 is screwed into the set collar 131 in the optical axis direction. A rear set collar 231 is swaged into the base plate 2 from the rear side, and a rear set screw 232 is screwed into the set collar 231 in the optical axis direction. At front end faces of the set screws 132 and 232 facing with each other, balls 133 and 233 are disposed, and the intermediate plate 5 are sandwiched by the balls 133 and 233 at the three positions along the circumferential direction. With this configuration, the intermediate plate 5 is allowed to move in the X-direction and Y-direction by revolutions of the both balls 133 and 233 respectively contacting the front and rear surfaces of the intermediate plate 5. Therefore, the correction lens frame 3 integrally formed with the intermediate plate 5 is also able to move in the X-direction and Y-direction with respect to the fixing frame 1 and the base plate 2. In order to stably support the intermediate plate 5 and the correction lens frame 3 and thereby realize appropriate movement thereof, a spacer 234 for adjusting the axial position of the rear set screw 232 and a spring 134 for absorbing play of the front set screw 132 in the optical axis direction are disposed.

As shown in FIG. 3, to the intermediate plate 5 integrally formed with the correction lens frame 3, the X drive coil 51x and the Y drive coil 51y respectively constituting the X magnetic actuator XM and the Y magnetic actuator YM are fixed. That is, when viewed from the front side of the intermediate plate 5, the X drive coil 51x is fixed on the right side along the circumferential direction, and the Y drive coil 51y is fixed on the lower side along the circumferential direction. Each of the X drive coil 51x and the Y drive coil 51y has a structure in which a thin conductive wire is wounded so as to have an elliptical shape, and is disposed such that the longer diameter direction of the elliptical shape is oriented along the tangential direction of the circumferential direction. Specifically, the longer diameter of the X drive coil 51x is oriented in the Y-direction, and the longer diameter of the Y drive coil 51y is oriented in the X-direction. Electrically, the drive coils 51a and 51y are integrally formed with a flexible board 8. Each of the drive coils 51x and 51y engages with support pieces 36a and 36b, and thereby is integrally supported and positioned by the correction lens frame 3.

In order to constitute the X magnetic actuator XM and the Y magnet actuator YM, openings 15 having a required size are formed in the fixing frame 1 at a right portion and a lower portion when viewed from the front side such that the openings 15 penetrate the fixing frame 1 in the optical axis direction. In this configuration, the X drive magnet 12x and the Y drive magnet 12y are fixed and supported in the respective openings 15. The X drive magnet 12x and the Y drive magnet 12y are integrally provided with respective front yokes 121 each of which has a rectangular shape, and each of the drive magnets 12x and 12y is inserted into the opening 15 from the front side of the fixing frame 1 and the front yoke 121 is fixed to the front surface of the fixing frame 1 by small screws 122 as shown in FIG. 2. The yoke 121 is made of a metal plate having permeability, such as a steel plate.

At a position between the intermediate plate 5 and the correction lens frame 3, a yoke plate 7 having a substantially semicircular shape is provided to expand in a circumferential area in which the X drive coil 51x and Y drive coil 51y are provided as shown in FIG. 3. The yoke plate 7 is fixed to the back surface of the fixing frame 1 with small screws and the like (not shown) at both edge portions of the yoke plate 7. As in the case of the yoke 121, the yoke plate 7 is made of a metal plate having permeability, such as a steel plate, and serves to increase the magnetic flux density of the drive magnets 12x and 12y in cooperation with the yoke 121. That is, the yoke plate 7 functions as a rear yoke with respect to the front yoke 121. Consequently, the X drive coil 51x, the X drive magnet 12x, the front yoke 121 and the rear yoke (the yoke plate) 7 constitute the X magnetic actuator XM of a moving coil type, and the Y drive coil 51y, the Y drive magnet 12y, the front yoke 121 and the rear yoke (the yoke plate) 7 constitute the Y magnetic actuator of a moving coil type.

Figure 7A:
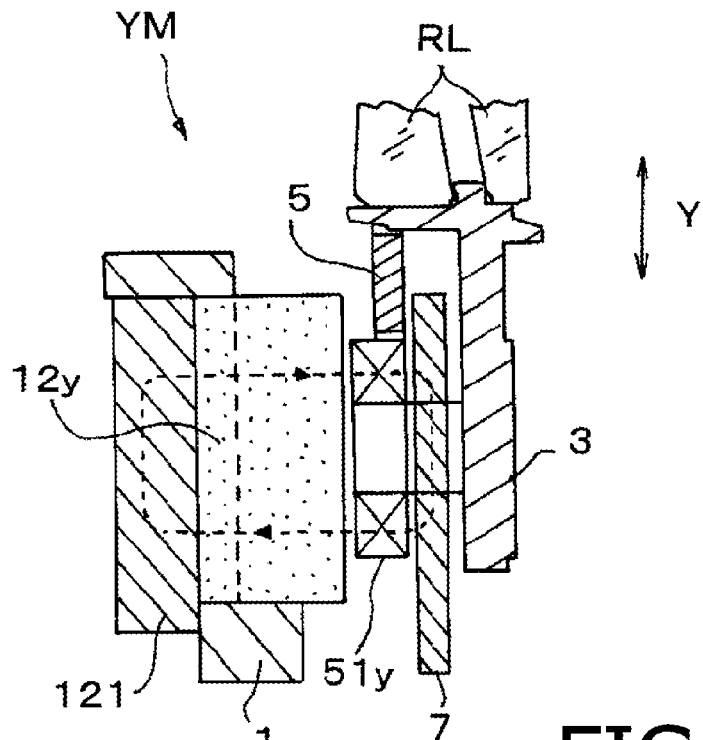
FIG. 7A is a cross sectional view of a magnetic actuator along an optical axis direction.
Figure 7B:
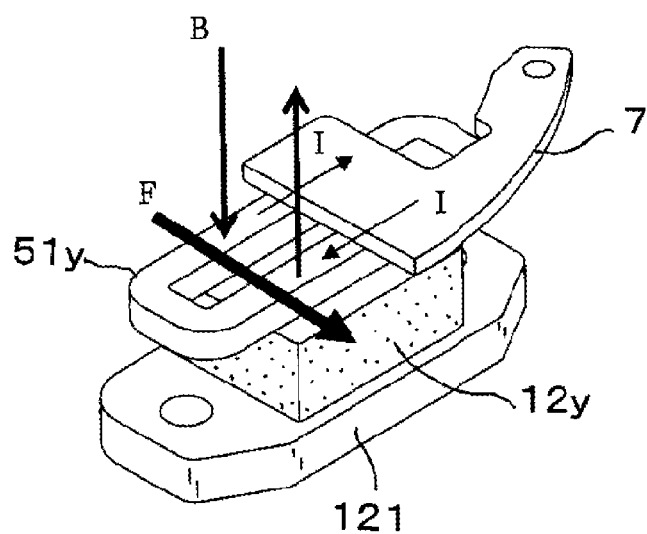
FIG. 7B is a perspective view of the magnetic actuator where a part thereof is removed for illustration.

FIG. 7A is a cross sectional view of the Y magnetic actuator YM, and FIG. 7B is a perspective view of the Y magnetic actuator YM where a part thereof is removed for illustration. As shown in FIGS. 7A and 7B, a magnetic field B is produced by the Y drive magnet 12y, the front yoke 121 disposed on the front side in the optical axis direction and the rear yoke 7 disposed on the rear side. The Y drive coil 51y is disposed in the magnetic field. In this configuration, by controlling the direction and amount of the current I flowing through the Y drive coil 51y via the flexible board 8 provided on the intermediate plate 5, a driving force F in the Y-direction is produced and applied to the Y drive coil 51y, and thereby movement of the Y drive coil 51y is controlled by the driving force F. The X magnetic actuator XM has substantially the same configuration as that of the Y magnetic actuator YM, and movement of the X drive coil 51x in the X-direction is controlled in a similar manner. As a result, the intermediate plate 5 supporting the X drive coil 51x and the Y drive coil 51y, i.e., the correction lens frame 3 integrally provided with the intermediate plate 5, is controlled to move in the X-direction and Y-direction with respect to the optical axis.

FIG. 5A is an exploded perspective view illustrating a structure for fixing the X drive magnet 12x of the X magnetic actuator XM to the fixing frame 1, and is viewed from the front side of the fixing frame 1. FIG. 8B is a cross sectional view of the X magnetic actuator XM and the fixing frame 1 along the Y direction. A part of the cross sectional structure is also shown in FIG. 2. The X drive magnet 12x of the X magnetic actuator XM is formed in a rectangular parallelepiped, and the front yoke 121 is fixed to the front surface of the X drive magnet 12x with, for example, an adhesive. The X drive magnet 12x can be inserted into the opening 15 formed in the fixing frame 1 in the optical axis direction. Furthermore, the front yoke 121 is formed in a plate-like shape to have the size in the Y direction longer than the X drive magnet 12x. The front yoke 121 is formed with screw holes 121a penetrating through the plate thickness direction at the respective end portions in the Y direction. By screwing the small screws 122 which have inserted into the screw holes 121a into the screw holes 15a formed in the fixing frame 1 at the both sides of the opening 15 in the Y direction, the front yoke 121 and the X drive magnet 12x are fixed to the fixing frame 1. The same applies to the Y magnetic actuator YM.

As described above, the rear yoke 7 is fixed to the fixing frame 1. Although not shown in FIGS. 8A and 8B, a supporting boss is formed to protrude rearward in the optical axis direction on the rear surface of the fixing frame 1. The front surface of the yoke plate 7 constituting the rear yoke contacts the tip face of the supporting boss, and the yoke plate 7 is fixed thereto by a small screw. As a result, the yoke plate 7 is fixed at a predetermined position with respect to the fixing frame 1, i.e., a predetermined position in the optical axis direction with respect to the X drive magnet 12x and the front yoke 121.

Figure 9A:
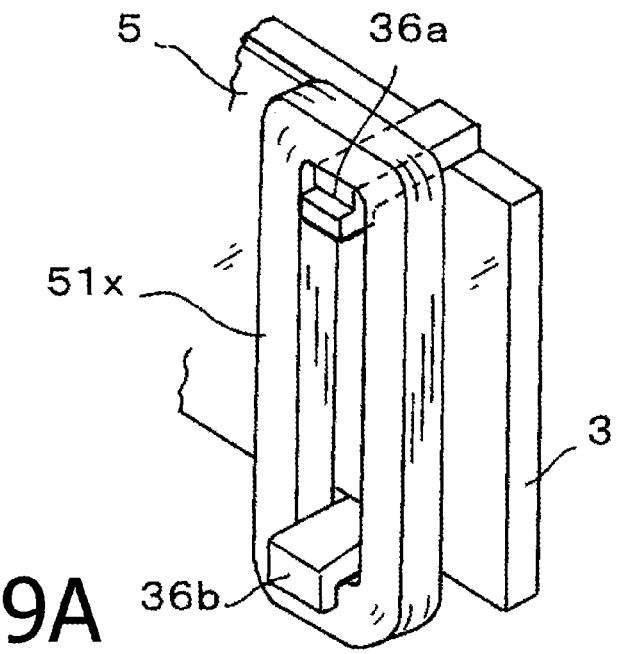
Figure 9B:
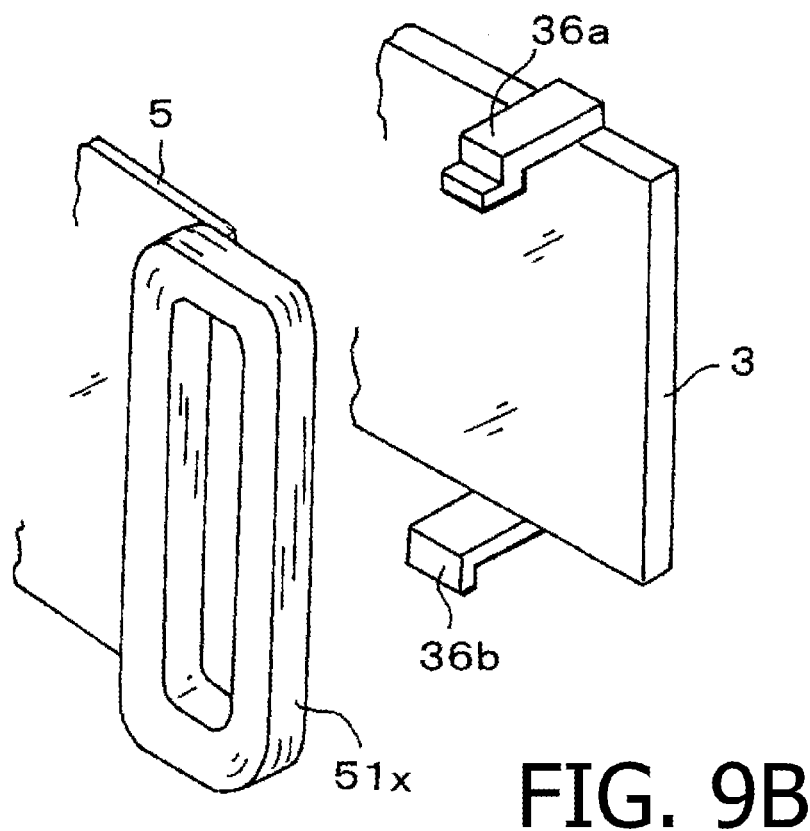

The drive coils 51x and 51y are integrally formed with the flexible board 8 electrically, and are supported by the correction lens frame 3 in a state of being positioned with respect to the correction lens frame 3. Hereafter, the structure of the X drive coil 51x is explained. Each of FIGS. 9A and 9B is a perspective view of the X drive coil 51x. FIG. 9A illustrates a state where the X drive coil 51x is supported by the correction lens frame 3, and FIG. 7B illustrates a state before the X drive coil 51*x* is supported by the correction lens frame 3. At positions on the correction lens frame 3 corresponding to the portion on the intermediate frame 5 at which the X drive coil 51*x* is supported, a pair of supporting pieces 36*a* and 36*b* is integrally provided with the correction lens frame 3 to have a predetermined interval in the direction of the longer diameter of the X drive coil 51*x*, i.e., in the Y-direction. Each of the supporting pieces 36*a* and 36*b* is formed to protrude frontward from the front surface of the correction lens frame 3.

As shown in FIG. 9B, the supporting piece 36*a* provided on the upper side is formed such that the supporting piece 36*a* protrudes straight in the optical axis direction and a tip thereof is bent downward in a shape of a crank. The supporting piece 36*b* provided on the lower side is formed, as a hooking piece, such that the supporting piece 36*b* protrudes straight in the optical axis direction and a tip thereof is bent downward at a right angle. The supporting pieces 36*a* and 36*b* are formed integrally with the correction lens frame 3. The supporting pieces 36*a* and 36*b* are provided to face with each other to have the predetermined interval in the Y direction, and the predetermined interval is approximately equal to the size of the inner diameter of the X drive coil in the longer diameter direction.

In order to fix the X drive coil 51*x* to the correction lens frame 3, the X drive coil 51*x* is pressed against the correction lens frame 3 from the front side such that the supporting pieces 36*a* and 36*b* fit into the inner portion of the X drive coil 51*x* in the longer diameter direction. Specifically, after the supporting piece 36*b* is inserted and fitted to the lower side of the inner portion of the X drive coil 51*x*, the X drive coil 51*x* is pressed against the correction lens frame 3, and then the supporting piece 36*a* is inserted into the upper side of the inner portion of the X drive coil 51*x*. As a result, the upper portion of the X drive coil 51*x* contacts the supporting piece 36*a*. Then, the X drive coil 51*x* is adhered to the supporting pieces 36*a* and 36*b* with an adhesion. Thanks to the supporting piece 36*b* formed as a hooking piece, the X drive coil 51*x* is prevented from being dropped off in the optical axis direction. Furthermore, since the rear surface of the X drive coil 51*x* contacts the front surface of the intermediate plate 5 which is integrally provided with the correction lens frame 3, the position of the X drive coil 51*x* in the optical axis direction is restricted, and thereby positioning of the X drive coil 51*x* with respect to the correction lens frame 3 and the intermediate plate 5 is achieved. This structural feature also applies to the Y drive coil 51*y*.

By employing the configuration where the X drive coil 51*x* and the Y drive coil 51*y* are fixed through use of only the supporting pieces 36*a* and 36*b* formed to protrude frontward from the correction lens frame 3, there is no necessity to dispose another component for fixing on the front side of the X drive coil 51*x* and the Y drive coil 51*y*. For example, a member having a shape of an inverted-L contacting coils 105*v* and 105*p* from the front side for fixing the coils 15*v* and 105*p* as shown in FIG. 1 of patent document (JP 2006-349803A) can be omitted. Therefore, it becomes possible to reduce the size in the optical axis direction of a region where the coils 51*x* and 5*y* are disposed, and thereby it becomes possible to reduce the thickness of the images shake correction device. As a result, it becomes possible to dispose the L-shaped guide plate 4 to overlap with the coils 51*x* and 51*y* in the optical axis direction as described later. By thus disposing the L-shaped guide plate 4 to face with the coils 51*x* and 51*y* in the optical axis direction, the barycenter defined when the correction lens frame 3 moves in the X-direction and Y-direction can be set to a position overlapping with the L-shaped guide plate 4 in the optical axis direction. Such a configuration enables stable movement of the correction lens frame 3.

By adjusting the screwing positions of the front set screw 132 and the rear set screw 232 with respect to the front set collar 131 and the rear set collar 231 in the ball retainers 13 and 23 as shown in FIG. 6, the position of the intermediate plate 5 can be adjusted in the optical axis direction with respect to the fixing frame 1. As a result, the positions of the X and Y drive coils 51*x* and 51*y* supported by the intermediate plate 5 and the correction lens frame 3 can be adjusted with respect to the fixing frame 1. That is, the relative position of the X and Y drive coils 51*x* and 51*y* with respect to the rear yoke 7 fixed to the fixing frame 1 can be adjusted.

Figure 8A:
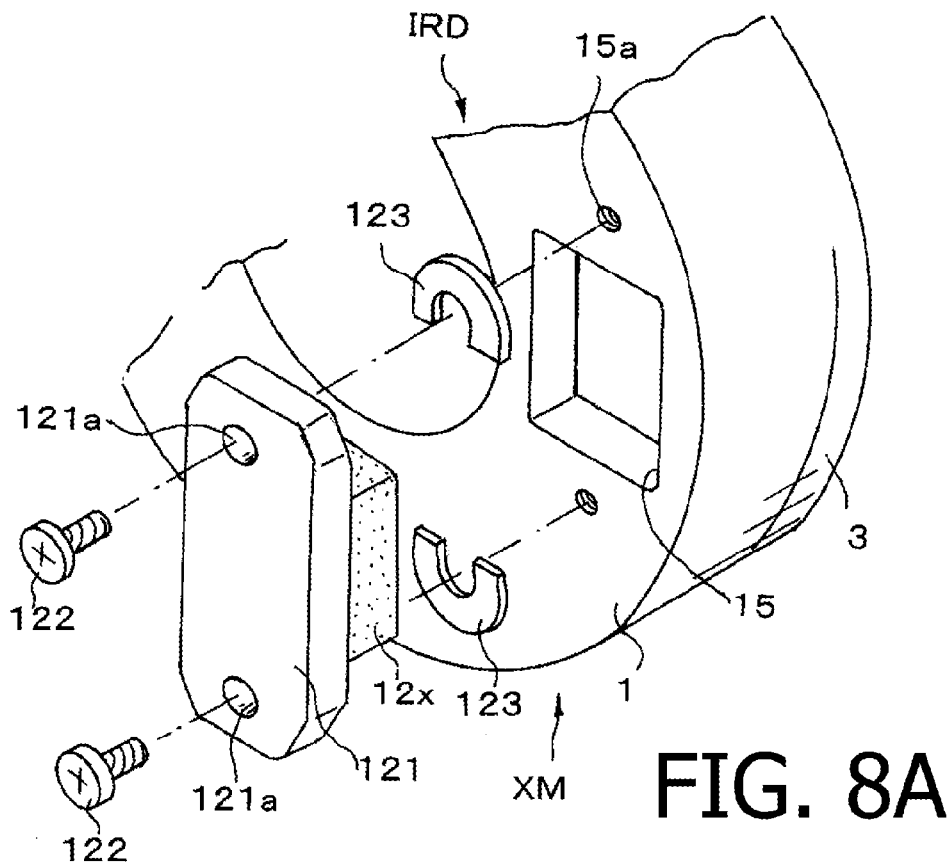
FIG. 8A is an exploded perspective view.
Figure 8B:
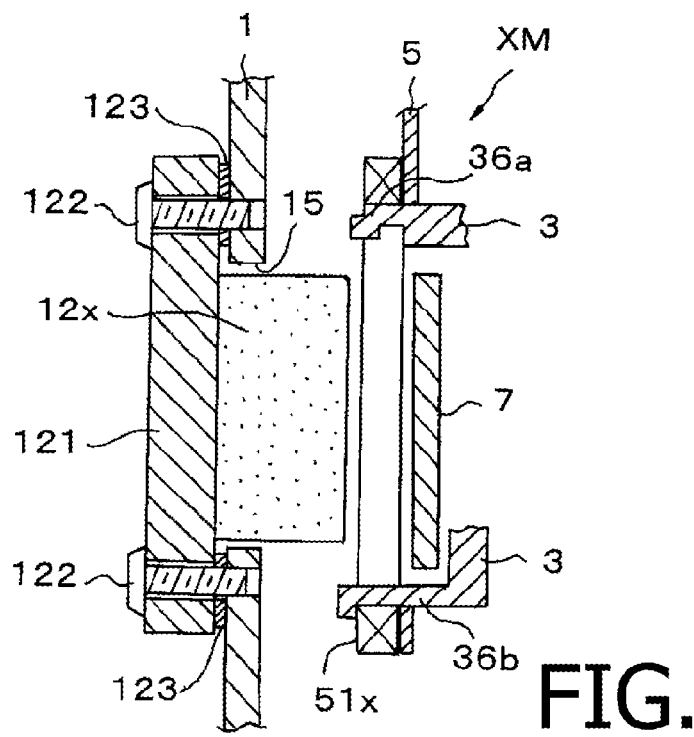

By thus configuring the X magnetic actuator XM and the Y magnetic actuator YM, in particular the X and Y drive magnets 12*x* and 12*y* and the front yoke 121 integrally provided with the X and Y drive magnets 12*x* and 12*y* can be fixed to the fixing frame 1 from the outside in the final process for assembling the image shake correction device IRD as shown in FIG. 8A. That is, it becomes possible to fix the X drive magnet 12*x* and the front yoke 121 with the small screws 122 from the front side of the fixing frame 1 after assembling the base plate 2, the correction lens frame 3, the intermediate plate 5 and the rear yoke 7 and so on to the fixing frame 1. The same applies to the Y drive magnet 12*y*. Therefore, a magnetic force existing in the X and Y drive magnets 12*x* and 12*y* does not badly affect assembling of the image shake correction device IRD, and thereby the assembling process can be eased. In general, image shake correction devices employ a neodymium magnet as a drive magnet, and such a neodymium magnet produces a considerably strong magnetic force. In such a case, it becomes difficult to mount a drive magnet at a desired position and in a desired posture to finely adjust the mounted position and to perform maintenance thereafter. By contrast, according to the embodiment, such a problem can be solved. Furthermore, in the case where the X and Y drive magnets 12*x* and 21*y* and the front yoke 121 are fixed to the fixing frame 1 and then the base plate 2, the correction lens frame 3, the intermediate plate 5 and the rear yoke 7 and so on are assembled thereto, the rear yoke 7 receives an attracting force in the optical axis direction by the magnetic force of the drive magnets 12*x* and 12*y* during assembling of the rear yoke 7. In this case, it becomes necessary to assemble the rear yoke 7 to the fixing frame against the attracting force, and thereby it becomes difficult to fix the rear yoke 7 at the desired position and in the desired posture. However, according to the embodiment, such a problem can be solved.

As shown in FIGS. 8A and 8B using the X magnetic actuator XM by way of example, when the X drive magnet 12*x* and the front yoke 121 are fixed to the fixing frame 1, shims 123 each having a shape of an arc are inserted between the rear surface of the front yoke 121 and the front surface of the fixing frame 1. This is because, although the position adjustment of the X drive coil 51*x* and the rear yoke 7 with respect to the fixing frame 1 can be achieved by executing the position adjustment in the optical axis direction using the ball retainers 13 and 23 shown in FIG. 6, the position adjustment between the X drive coil 51*x* and the X drive magnet 12*x* is not achieved by only the adjustment using the ball retainers 13 and 23. For this reason, as shown in FIG. 8B, the position of the rear surface of the front yoke 121 with respect to the front surface of the fixing frame 1 in the optical axis direction is changed by letting the shim 123 intervene between the rear surface of the front yoke 121 and the front surface of the fixing frame 1. As a result, the position of the rear surface of the X drive magnet 12x integrally provided with the front yoke 121 is changed, and thereby the gap size between the rear surface of the X drive magnet 12x and the X drive coil 51x facing the rear surface of the X drive magnet 12x can be changed. A plurality of types of shims 123 having different plate thicknesses may be prepared in advance, and one or some of these shims may be selected according to the need. In this case, the gap size can be adjusted by a size of the difference between the plate thicknesses of the shims 123. This also applies to the Y magnetic actuator YM.

The thickness tolerance in the optical axis direction of the X and Y drive magnets 12x and 12y is ±0.1 mm, and the tolerance of the plate thickness of the front yoke 121 is ±0.05 mm. Therefore, by preparing the shims 123 having the thicknesses of 0.05 mm and 0.1 mm, the position adjustment for cancelling the tolerance can be achieved. It should be noted that, by laminating a plurality of shims having the same thickness, shims having the different total plate thicknesses may be prepared. In this case, the position adjustment for the different size can be realized.

On the correction lens frame 3, a X position magnet 34x and a Y position magnet 34y respectively constituting the position sensors XS and YS which detect the position in the X-direction and Y-direction with respect to the optical axis are integrally fixed at different positions along the circumferential direction. On the other hand, a X hall effect device unit 14x and a Y hall effect device unit 14y for detecting a magnetic field are provided on respective positions on the fixing frame 1 to face the X position magnet 34a and the Y position magnet 34y, respectively.

Figure 10:
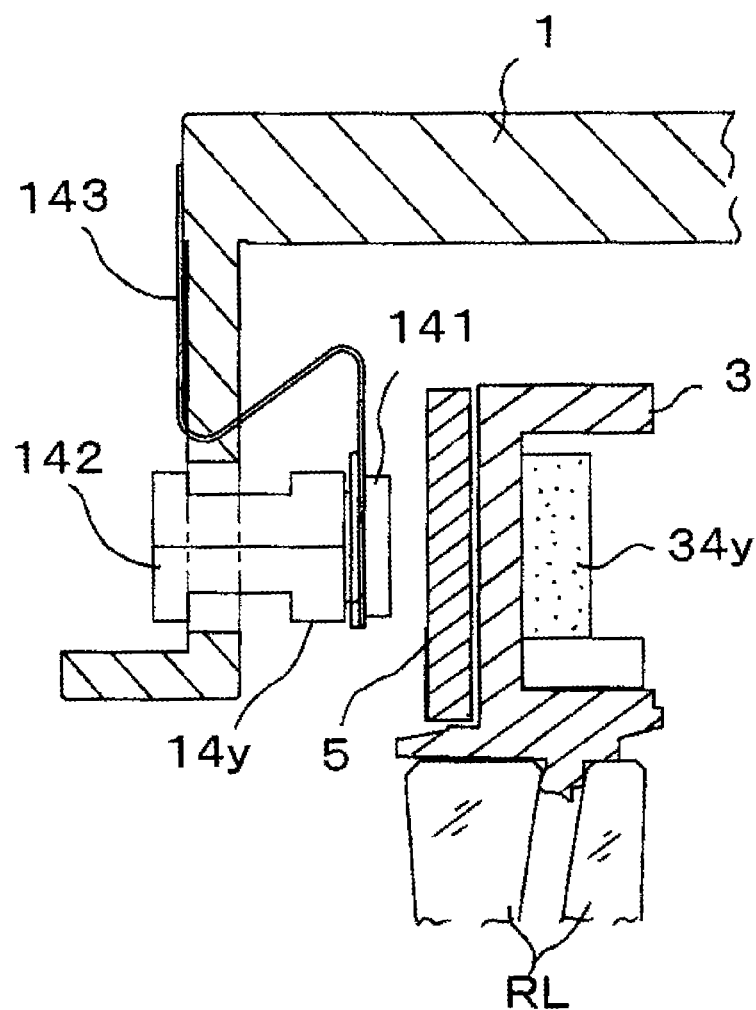
FIG. 10 is a cross sectional view of a position sensor in the optical axis direction.

FIG. 10 shows a cross sectional view of the Y position sensor YS along the optical axis direction. As shown in FIG. 10, the Y position sensor YS is configured such that the Y hall effect device unit 14y fixed to the fixing frame 1 is disposed to face, in the optical axis direction, the Y position magnet 34y fixed on the correction lens frame 3. The Y hall effect device unit 14y is configured such that a hall effect device 141 is mounted on a hall effect device base 142 to be fixed to the fixing frame 1. The same applies to the X position sensor XS. The positions of the position magnets 34x and 34y relative to the hall effect device units 14x and 14y change as the correction lens frame 3 moves in the X direction and Y direction. Therefore, an electric output of the hall effect device units 14x and 14y changes depending on the relative positional change between the hall effect device units 14x and 14y and the position magnets 34x and 34y. Consequently, the position of the correction lens frame 3 in the X-direction and Y-direction can be detected by the change in the electric output. Since such position detection using a magnet and a hall effect device is known, further detailed explanation thereof is omitted.

Figure 11A:
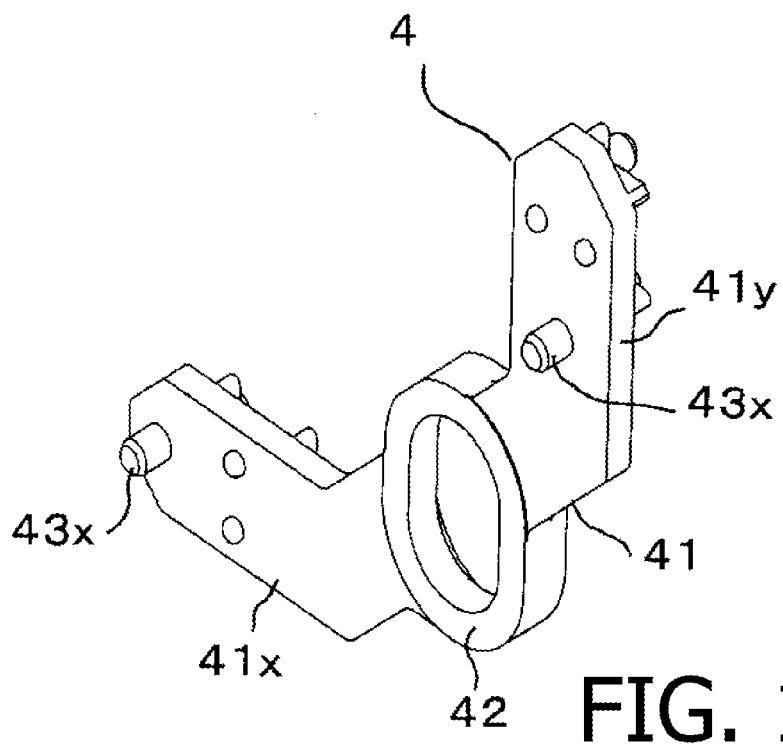
FIGS. 11A and 11B are perspective of a L-shaped guide plate viewed from a front side and a rear side, respectively.
Figure 11B:
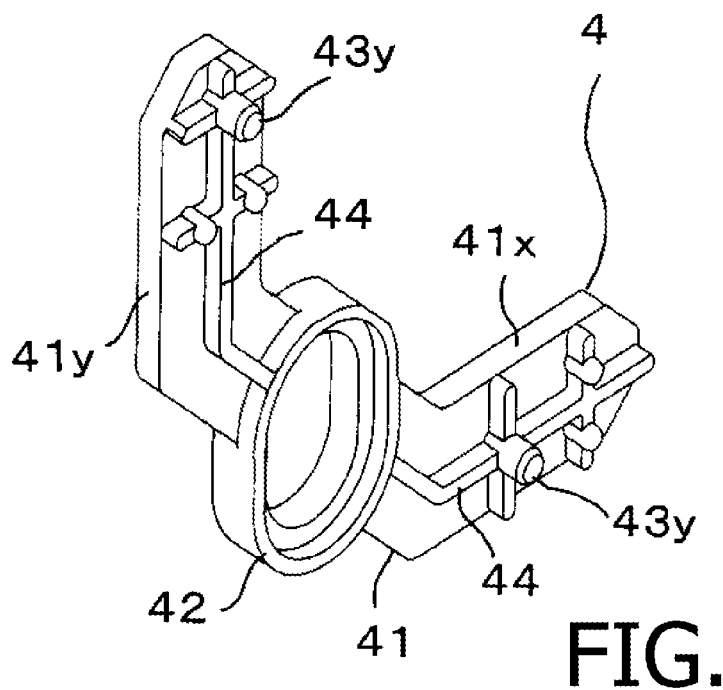

FIGS. 11A and 11B show perspective views of the L-shaped guide plate 4 viewed from the front side and the rear side, respectively. As shown in FIGS. 11A and 11B, the L-shaped guide plate 4 for guiding the correction lens frame 3 in the X-direction and Y-direction is formed of a plate-like member having an L-shape. In order that a corner part of the L-shape of the L-shaped guide plate 4 does not protrude from a circumferential edge of the circular fixing frame 1 and the base plate 2, a central part 41 disposed at a central portion in the lengthwise direction of the L-shaped guide plate 4 is formed to extend obliquely, and the L-shaped guide plate 4 has a plate-like X part 41x extending in the X-direction from the central portion, and a plate-like Y part 41y extending in the Y-direction from the central part. The L-shaped guide plate 4 is disposed in an area expanding from the lower area to the right area on the correction lens frame 3 and the base plate 2 when viewed from the front side. In other words, the L-shaped guide plate 4 is disposed in an area along the circumferential direction in which the X magnetic actuator XM and the Y magnetic actuator YM are disposed when viewed from the front side.

As described above, the L-shaped guide plate 4 is provided to be able to move in the X-direction with respect to the fixing frame 1 and in Y-direction with respect to the base plate 2. Further, the L-shaped guide plate 4 is configured such that an elliptical through hole 42 having a longer diameter in the Y-direction is formed at a central portion thereof. The through hole 42 lets one of the ball retainers 13 and 23 penetrate therethrough, and thereby the L-shaped guide plate 4 is allowed to move in the Y-direction without interfering with the ball retainers 13 and 23. Furthermore, on the rear surface of the L-shaped guide plate 4, a reinforcement rib 44 is integrally formed to extend from the periphery of the insertion hole 42 to the edges of the X part 41x and the Y part 41y so that the strength of the L-shaped guide plate 4 is enhanced.

The L-shaped guide plate 4 is formed with guide pins 43x and 43y. Specifically, on the front surface of the both end portions of the L-shaped guide plate 4, a pair of guide pins 43x is formed to protrude frontward in the optical axis direction. On the rear surface of the both end portions of the L-shaped guide plate 4, a pair of guide pins 43y is formed to protrude rearward in the optical axis direction. Hereafter, each of the guide pins 43x provided on the front side is referred to as a X guide pin, and each of the guide pins 43y provided on the rear side is referred to as a Y guide pin.

Figure 12A:
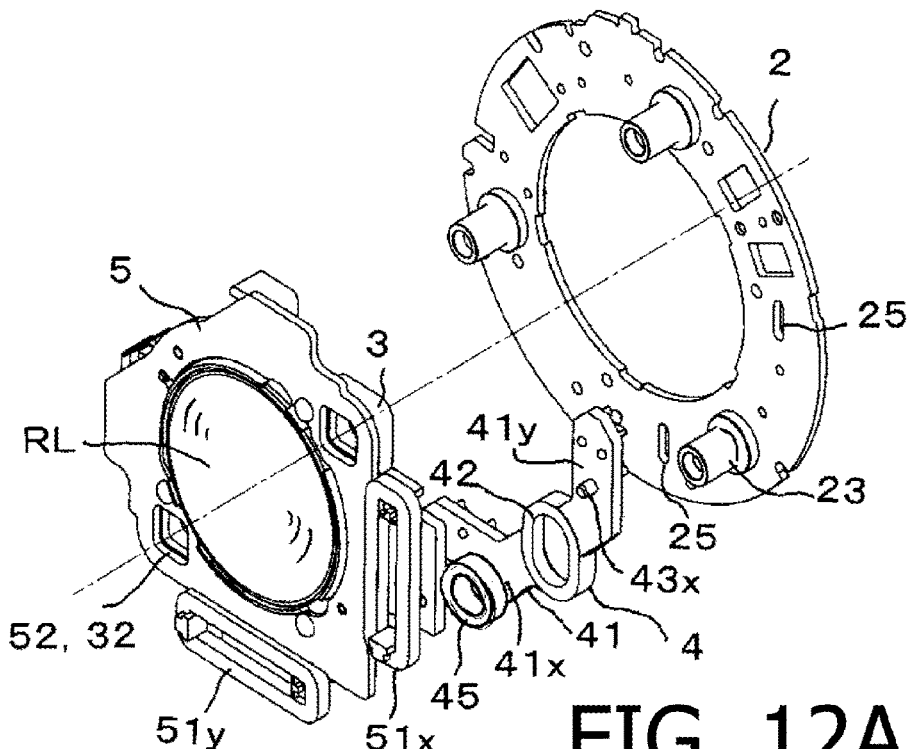
FIGS. 12A and 12B are exploded perspective views of an intermediate plate, a correction lens frame, the L-shaped guide plate and a base plate viewed from the front side and the rear side, respectively.
Figure 12B:
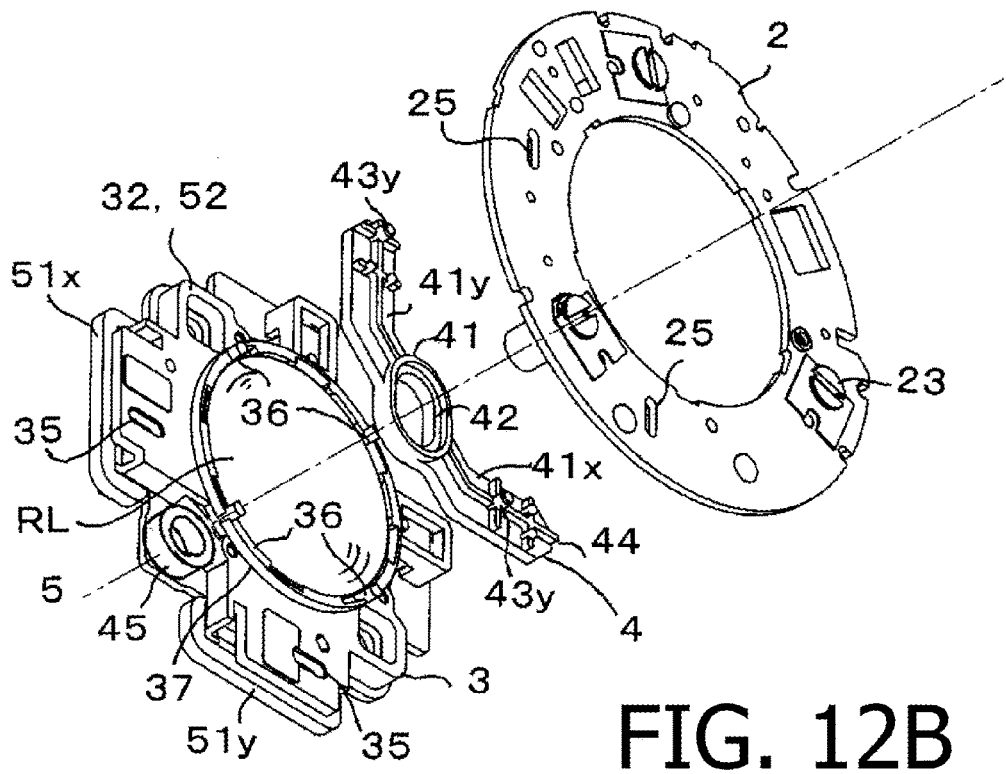

Each of FIGS. 12A and 12B shows an exploded perspective view of a principal portion in which relationship between the intermediate plate 5, the correction lens frame 3, the L-shaped guide plate 4 and the base plate 2 is illustrated. The ball retainer 23 is inserted into the through hole 42 of the L-shaped guide plate 4 from the rear side, and a cylindrical collar 45 is fitted to the ball retainer 23 from the front side. With this configuration, the L-shaped guide plate 4 is positioned in the optical axis direction by being sandwiched in the optical axis direction between the ball retainer 23 and the collar 45, and is able to move in the Y-direction with respect to the base plate 2. A pair of X guide holes 35 is formed on the rear surface of the correction lens frame 3 correspondingly to the X guide pins 43x and 43x, and a pair of Y guide holes 25 is formed on the front surface of the base plate 2 correspondingly to the Y guide pins 43y and 43y. FIG. 12A is a perspective view viewed in the same direction as that of FIG. 3. The pair of Y guide holes 25 each of which has an elliptical shape elongated in the Y-direction is formed on the front surface of the base plate 2, and the Y guide pins 43y and 43y of the L-shaped guide plate 43 are fitted into the Y guide holes 25 so that the L-shaped guide plate 4 is allowed to relatively move in the Y-direction in the Y guide holes 25. FIG. 12B is a perspective view viewed from the rear side. The pair of X guide holes 35 each of which has an elliptical shape elongated in the X-direction are formed on the rear surface of the correction lens frame 3, and the X guide pins 43x and 43a of the L-shaped guide plate 4 are fitted into the X guide holes 35 so that the L-shaped guide plate 4 is allowed to relatively move in the X-direction in the X guide holes 35. In this embodiment, each of the guide holes 25 and 35 is formed as a through hole penetrating in the optical axis direction through the frame and the plate; however, each of the guide holes 25 and 35 may be formed as a recession recessed in the optical axis direction.

Figure 13A:
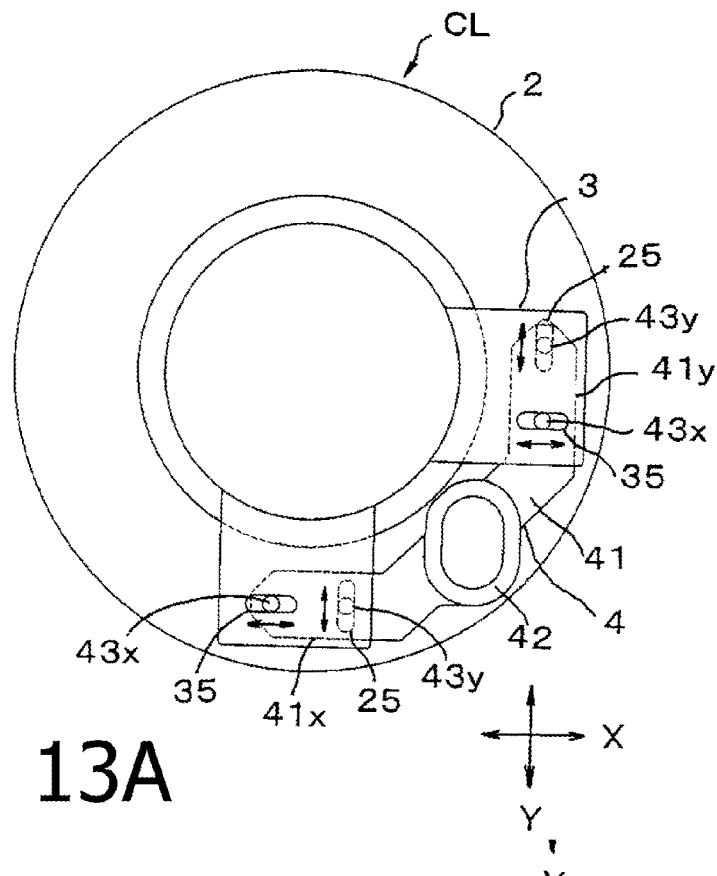
FIGS. 13A and 13B are schematic diagrams viewed from the front side for explaining a guiding operation and an arranged position of the L-shaped guide plate.
Figure 13B:
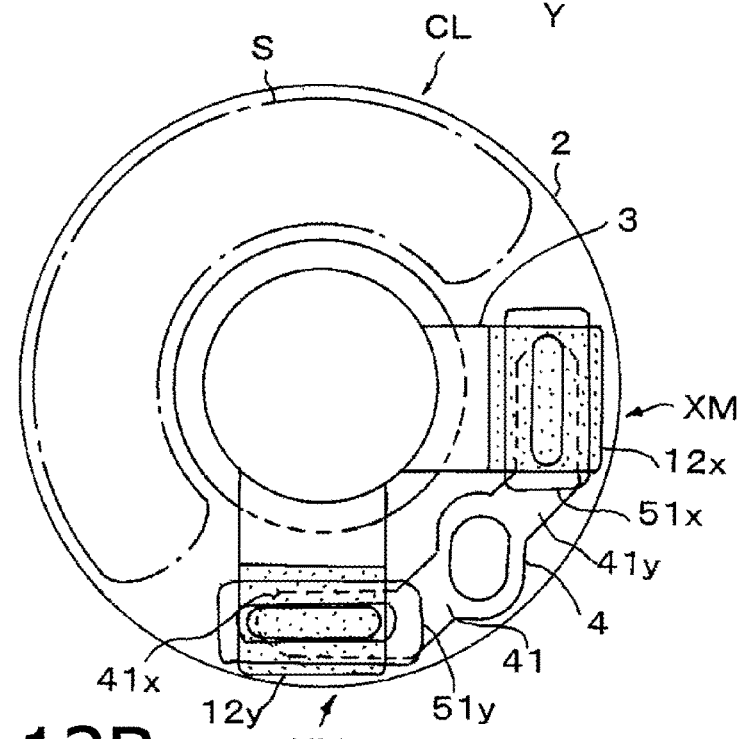

As shown as a schematic view in FIGS. 13A and 13B where the positional relationship between the L-shaped guide plate 4, the correction lens frame 3 and the base plate 2 is shown, by providing the L-shaped guide plate 4, the correction lens frame 3 is moved in the X-direction relative to the L-shaped guide plate 4 through fitting between the X guide pin 43x and the X guide hole 35. In this case, due to fitting between the Y guide pin 43y and the Y guide hole 25, the L-shaped guide plate 4 is integrally formed with the base plate 4 in the X-direction, and therefore the L-shaped guide plate 4 is not moved in the X-direction. Furthermore, through fitting between the Y guide pin 43y and the Y guide hole 25, the correction lens frame 3 is able to move in the Y-direction, integrally with the L-shaped guide plate, relative to the base plate 2. That is, due to fitting between the X guide pin 43x and the X guide hole 35, the L-shaped guide plate 4 moves in the Y-direction integrally with the correction lens frame 3.

As described above, the L-shaped guide plate 4 formed in a shape of a plate is disposed between the correction lens frame 3 and the base plate 2. Such a configuration is achieved by allowing the X magnetic actuator XM and the Y magnetic actuator YM to be disposed on the front side of the correction lens frame 3. That is, as explained with reference to FIG. 7A, the intermediate plate 5 is integrally provided on the front side of the correction lens frame 3, and the drive coils 51x and 51y are disposed on the intermediate plate 5. Further, the drive magnets 12x and 12y and the front yoke 121 and the rear yoke 7 are disposed to sandwich the drive coils 51x and 51y in the optical axis direction. As a result, the magnetic actuators XM and YM do not exist on the rear surface of the correction lens frame 3, and therefore there is no necessity to consider interference between the magnetic actuators XM and YM and the L-shaped guide plate 4. Consequently, it becomes possible to form the L-shaped guide plate 4 with a plate-like member and to dispose the L-shaped guide plate 4 on the rear side of the correction lens frame 3.

The L-shaped guide plate 4 is disposed to overlap with the X magnetic actuator XM and the Y magnet actuator YM when viewed along the optical axis direction. The details about this configuration are described later. As shown in FIG. 13B in which the positional relationship is illustrated, the X part 41x of the L-shaped guide pate 4 is disposed in the circumferential area overlapping with the Y magnetic actuator YM, and the Y part 41Y is disposed in the circumferential area overlapping with the X magnetic actuator XM. As a result, it becomes possible to secure a apace S in the circumferential area in which the X magnetic actuator XM and the Y magnetic actuator YM are not disposed.

Figure 14:
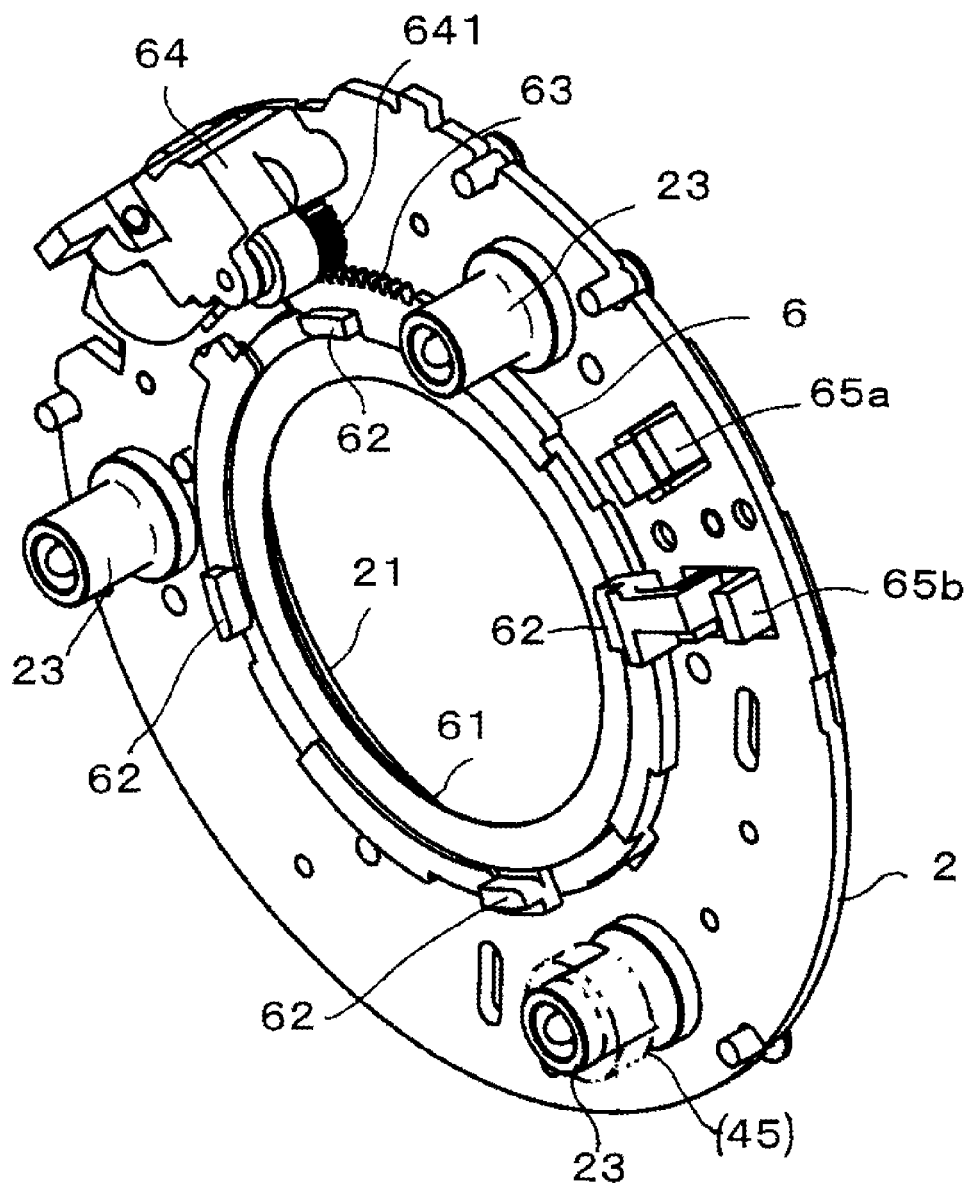
FIG. 14 is a perspective view of the base plate and a locking ring viewed from the front side.

The locking mechanism for restricting movement of the correction lens frame 3 in the X-direction and Y-direction includes the locking ring 6 shown in FIG. 3. FIG. 14 is a perspective view of the base plate 2 provided with the locking mechanism including the locking ring 6 viewed from the front side. The locking ring 6 is formed to be a ring-shaped plate like member having the circular center opening 61, and is supported by the base plate 2 so as to be able to rotate about the optical axis by a required angle. Although not shown in FIG. 14, the locking ring 6 may be configured such that a sleeve having a shape of a short cylinder is formed along the inner periphery of the locking ring 6, i.e., along the periphery of the center opening 61 of the locking ring 6, to protrude in the optical axis direction. In this case, by fitting the sleeve into the inner periphery of the center opening 21 of the base plate 2, the outer circumferential surface of the sleeve may slide along the inner periphery of the base plate 2.

The locking ring 6 is provided with locking pieces 62 each of which is formed to protrude in the optical axis direction, and the locking pieces 62 are provided at four positions dividing a virtual circle having a predetermined diameter and centered at the optical axis into four equal segments. Each of the locking pieces 62 is formed as a part of a circumferential wall (i.e., the locking pieces 62 are discretely formed partial walls formed by removing portions of the circumferential wall other than positions of the locking pieces 62). The locking pieces 62 are formed as a part of circumferential wall in this embodiment; however, the locking pieces 62 may be formed as straight walls each of which is oriented along a line tangential to the virtual circle. The locking pieces 62 are provided to respectively face four locking projections 36 formed on the rear surface of the correction lens frame 3. The locking piece 62 is formed to have a tapered shape when the locking ring 6 is viewed from the front side, so that, when the locking pieces 62 contacts the locking projection 36, the locking pieces 62 is able to smoothly contact the locking projection 36 as described in detail later.

As shown in FIGS. 4 and 12B, the locking pieces 36 each of which is formed to project rearward in the optical axis direction are provided on the rear surface of the correction lens frame 3 at four positions equally dividing the circumferential direction. Specifically, each locking projection 36 is formed, as a part of the correction lens frame 3, to be a short cylindrical pin formed on the rear surface in the optical direction of a lens fixing ring 37 for fixing the correction lens RL. In regard to the radial direction, each of the four locking projections 36 is located along a virtual circle whose diameter is substantially equal to the virtual circle along which the locking prices 62 are provided. In regard to the circumferential direction, the locking projections 36 are provided at angular positions which equally divide the circumferential direction and which are substantially equal to those of the locking pieces 62. The four locking projections 36 are provided at the angular positions intersecting with the X-direction and Y-direction at 45 degrees.

As shown in FIG. 14, a selector gear wheel 63 is integrally formed with the outer circumferential part of the locking ring 6, and a gear box 64 supported by the base plate 2 engages with the selector gear wheel 63. The gear box 64 is formed as an actuator which is driven by a driving source such as a motor (not shown) and includes a pinion 641 serving as a final rotation output driven by the motor. The pinion 641 engages with the selector gear wheel 641. In this configuration, when the gear box 64 is driven and thereby the pinion 641 is rotated, the locking ring 6 is rotated via the selector gear wheel 63 about the optical axis by an angular amount by which the selector gear wheel 63 is rotated.

On the front surface of the base plate 2 facing the outer circumferential part of the locking ring 6, a pair of photointerruptors 65a and 65b are disposed to have a small interval therebetween in the circumferential direction. By using the photointerruptor 65a and 65b, the rotational position of the locking ting 6 can be detected. The gear box 64 and the photointerruptors 65a and 65b are electrically connected to the outside via a flexible board 9 disposed on the rear surface of the base plate 2. Since position detection through use of a photointerruptor is known, explanation thereof is omitted for the sake of simplicity. By executing feedback control for the gear box 64 based on the rotational position of the locking ring 6, the rotational position of the locking ring 6 is controlled at a first rotational position equal to a lock-released position and a second rotational position equal to a locked position.

In the above explained image shake correction device IRD, when the camera shake occurs at a timing of photographing by the camera CAM, the vibration detectors XG and YG detect the camera shake. The lens CPU mounted on the lens barrel CL calculates the drive current based on the detected camera shake, and supplies the calculated drive current to the X drive coil 51x and the Y drive coil 51y via the flexible board 8. As a result, the X and Y magnetic actuators XM and YM are driven, and the correction lens frame 3 is moved in the X-direction and Y-direction so that the camera shake is canceled. The image shake correction is thus performed. In this case, the moving amount of the correction lens amount 3 in the X-direction and Y-direction is detected by the X and Y position sensors XS and YS, and the feedback controlled is performed for the X and Y magnetic actuators XM and YM so that the correction lens frame 3 is precisely moved to the required position and the camera shake is canceled.

As explained above with reference to FIG. 7B, in the X magnetic actuator XM, by causing the current to flow through the X drive coil 51x in the magnetic field produced by the X drive magnet 12x and yokes 121 and 7, a driving force by a Lorentz force is produced, and thereby the correction lens frame 3 is moved in the X-direction. Similarly, in the Y magnetic actuator YM, by causing the current to flow through the Y drive coil 51y in the magnetic field produced by the Y drive magnet 12y and yokes 121 and 7, a driving force is produced, and thereby the correction lens frame 3 is moved in the Y-direction.

When the correction lens frame 3 is moved in the X-direction by the X magnetic actuator XM, movement of the correction lens frame 3 in the X-direction is allowed by the relative movement of the X guide hole 35 formed on the rear surface of the correction lens frame 3 and the X guide pin 43x formed on the front surface of the L-shaped guide plate 4 in the X-direction. When the correction lens frame 3 is moved in the Y-direction by the Y magnetic actuator YM, movement of the correction lens frame 3 in the Y-direction is allowed by the relative movement of the Y guide pin 43y and the Y guide hole 25 in the Y-direction.

When the image shake correction is performed, the locking ring 6 constituting the locking mechanism is set to the lock-released position being the first rotational position. This setting is performed based on the photographer's operation. FIG. 15A is a perspective view illustrating the lock-released state of the base plate 2, the correction lens frame 3 and the locking ring 6 viewed from the front side. In this state, the locking ring 6 is set to the lock-released position by controlling the current supplied to the gear box 64 (now shown in FIG. 15A) and thereby rotating the pinion 641 so that the locking ring 6 is rotated by the selector gear wheel 63 in the clockwise direction by a small angle when viewed from the front side. At the lock-released position, as shown in FIG. 15B which is a schematic view viewed along the optical axis direction, the four locking piece 62 of the locking ring 6 are set at positions different, in the circumferential direction, from positions of the four locking projections 36 of the correction lens frame 3. Therefore, even when the correction lens frame 3 moves in the X and Y directions. The locking projections 36 do not contact the locking pieces 62. As a result, free movement of the correction lens frame Sin the X and Y directions is secured, and thus the image shake correction is realized. It should be noted that the moving amount of the correction lens frame 3 in the X-direction and Y-direction is limited by the difference in size between the post 11 and the shaft hole 32.

On the other hand, in the case where the image shake correction is not performed (e.g., in a non-photographing state), the locking ring 6 is set to the locked position being the second rotational position by controlling the current supplied to the gear box 64 and thereby rotating the locking ring 6 in the counterclockwise direction by a small angle when viewed from the front side. FIG. 16A is a perspective view illustrating the locked state of the base plate 2, the correction lens frame 3 and the locking ring 6 viewed from the front side. In the locked state shown in FIG. 16B as a schematic view viewed along the optical axis direction, the four locking pieces 62 of the locking ring 6 are set at the same positions along the circumferential direction as those of the four locking projections 36 of the correction lens frame 3. As a result, movement of the locking projections 36 is restricted in the outward radial direction by the respective locking pieces 62. Therefore, movement of the correction lens frame 3 in the moving direction along the L-shaped guide late 4 (i.e., movement in the X-direction and Y-direction) is restricted, and thus the correction lens frame 3 is brought to the locked state. Consequently, the correction lens frame 3 is prevented from being unexpectedly moved due to, for example, externally applied shock or vibration, and thereby the correction lens frame 3 and the image shake correction device are protected.

As described above, control of the rotational position of the locking ring 6 between the locked position and the lock-released position is performed by detecting the rotational position of the locking ring 6 with the pair of photointerruptors 65a and 65b and by executing feedback control for the gear box 64 based on the detection result. For example, by detecting a notch or a hole formed in an outer peripheral part of the locking ring 6 with the pair of photointerruptors 65a and 65b, the rotational position of the locking ring 7 can be detected. Needless to say, the locking ring 6 may be formed to be manually operated.

As described above, in this embodiment, the locking pieces 62 each of which is formed to protrude in the optical axis direction are provided on the front surface, i.e., the surface orthogonal to the optical axis, of the locking ring 6 are provided so as to be distributed in the circumferential direction, and the locking projections 36 each of which is formed to protrude in the optical axis direction are provided on the rear surface, i.e., the surface orthogonal to the optical axis, of the correction lens frame 6 for executing the image shake correction are provided so as to be distributed in the circumferential direction. In this configuration, movement of the correction lens frame 3 is locked by letting the licking pieces 62 and the locking projections 36 contact with each other in the radial direction. In this configuration, as shown as a schematic cross sectional view in the optical axis direction in FIG. 17, the locking ring 6 is provided at the position different from the positions of the correction lens frame 3 and the locking projections 36 in the optical axis direction. Therefore, the locking ring 6 is not disposed such that the locking ring 6 is located at the same position as those of the correction lens frame 3 and the locking projections 36 in the optical axis direction and overlaps with the correction lens frame 3 and the locking projections 36 in the radial direction. Accordingly, in regard to the outer diameter of the locking ring 6, the locking ring 6 may be formed with a ring-shaped plate having the diameter, at the maximum, within which the locking pieces 62 can be disposed properly. As a result, the outer diameter of the locking ring 6 can be reduced.

Since the locking pieces 62 are formed as partial walls protruding in the optical axis direction and distributed along the circumferential direction, regarding the size of each locking piece 62 in the radial direction (i.e., the plate thickness of the locking piece 62), the plate thickness required to restrict movement of the locking projection 36 by contacting the locking projection 62 is sufficient. It is understood also from this fact that there is no necessity to uselessly increase the size of the locking ring 6 in the radial direction. It is sufficient that the locking projection 36 is located at the position in the radial direction larger than the outer diameter of the correction lens RL supported in the correction lens frame 3. Therefore, the locking projection 36 may be integrally formed on the lens fixing ring 37 for the correction lens RL as in the case of the embodiment. As a result, it becomes possible to set the position in the radial direction of the locking pieces 62 contacting the locking projection 36 to have the minimum size, and thereby it becomes possible to reduce the size in the radial direction of the locking ring 6 to the minimum size. Consequently, it becomes possible to further reduce the diameter of the locking ring 6, and thereby the diameter of the image shake correction device can be reduced.

As can be seen from FIG. 15B, in the lock-released state, the four locking pieces 62 are not positioned on extended lines extending from the four locking projections 36 in the X and Y directions. Therefore, even when the correction lens frame 3 is moved largely in the X-direction and Y-direction, the locking projections 36 do not contact the locking pieces 62. Therefore, movement of the correction lens frame 3 is not restricted. Accordingly, even when the locking ring 6 is formed to have a small diameter, movement of the correction lens frame 3 in the X-direction and Y-direction for correcting the image shake can be secured and thereby an appropriate image shake correction can be achieved.

Since the locking ring 6 is configured not to lock the correction lens frame 3 at the inner circumferential part of the center opening 61 thereof, there is no necessity to form the shape of the center opening 61 to be a non-circular shape as in the case of the patent documents 1 and 2. That is, the center opening 61 can be made circular. As a result, designing and manufacturing of the locking ring 6 can be eased. Since the shape of the center opening 61 of the locking ring 6 can be made circular, it becomes possible to use the locking ring 6 as a fixed aperture member in the lens barrel CL, and reduction of the inner surface reflection in the lens barrel CL and enhancement of the optical performance can be realized. Alternatively, an optical component, such as a lens or an aperture stop, may be disposed on the locking ring 6.

In the above described embodiment, the locking is achieved by letting the locking piece 62 contact the outer circumferential side of the locking projection 36; however, locking may be achieved by letting the locking piece 62 contact the inner circumferential side of the locking projection 36 as long as such design is possible in regard to a space aspect. In this case, the position in the radial direction of the locking pieces 62 can be set at a further inner side, and thereby the size of the locking ring 6 and the image shake correction device in the radial direction can be further reduced.

As described above, in the lock-released state, the correction lens frame 3 is allowed to move in the X and Y directions by the X magnetic actuator XM and the Y magnetic actuator YM, and in this case movement of the correction lens frame 3 is restricted by fitting between the guide pins 43x and 43y provided on the L-shaped guide plate 4 and guide holes 35 and 25 formed in the correction lens frame 3 and the base plate 2. As shown in FIG. 13B, the moving force in the X-direction acts on the correction lens frame 3 by the X magnetic actuator XM in the right region when viewed from the front side, and the moving force in the Y-direction acts on the correction lens frame 3 by the Y magnetic actuator YM in the lower region when viewed from the front side. That is, these moving forces act at decentered positions with respect to the optical axis. Therefore, there is a concern about a moment of rotation as follows.

That is, regarding image shake correction devices described Japanese Patent Provisional Publications No. 2006-349803A (hereafter, referred to as patent document 3), No. H10-197911A (hereafter, referred to as patent document 4) and 2008-185643A (hereafter, referred to as patent document 5), a point of action at which the moving force for moving a correction optical system from the actuator acts and a guide point at which the correction optical system is guided by a guide shift with respect to each other in the optical axis direction and when viewed along the optical axis direction. In this case, a moment of rotation might act on the correction optical system in the X and Y directions, and thereby the correction optical system might be inclined. If such inclination of the correction optical system occurs, smooth movement of the correction optical system is hampered. Furthermore, the subject image might be distorted, by which the image shake correction property is deteriorated. Japanese Patent Provisional Publication No. 2007-25164A (hereafter, referred to as patent document 6) aims to solve such a problem. However, since the patent document 6 employs a vibration type linear actuator, the guide shaft itself constitute a part of the vibration type linear actuator, and therefore the guide shaft needs to be integrally formed with the vibration type linear actuator. Therefore, the configuration of the patent document 6 cannot be applied to the configuration of the patent documents 3, 4 and 5 because, in the image shake correction device using the magnet type actuator, interference between the magnetic actuator and the guide shaft need to be avoided.

By contrast, according to the embodiment, the correction lens frame 3 is configured to be guided in regard to movement in the X-direction and Y-direction while being supported by the L-shaped guide plate 4. That is, the correction lens frame 3 is moved while maintaining the fitted state between the X and Y guide pins 43x and 43y and the guide holes 35 and 25 at the Y part 41y and X part 41x. This means that, when viewed along the optical axis, the correction lens frame 3 is moved while maintaining the supported state of being supported by the fixed part (the fixing frame 1 and the base plate 2) of the lens barrel at the Y part 41y and the X part 41x of the L-shaped guide plate 4. The supported portion of the correction lens frame 3 corresponds to an area overlapping with the X drive actuator XM and the Y drive actuator YM when viewed along the optical axis direction.

Therefore, the moving force by the X magnetic actuator XM is applied to the correction lens frame 3 when the correction lens frame 3 moves in the X direction; however, the moving force is applied to a portion being supported by the Y part 41y of the L-shaped guide plate 4. Therefore, the point of action of the moving force in the X-direction applied to the correction lens frame 3 overlaps with the portion supporting the correction lens frame 3 in the optical axis direction. As a result, the moment of rotation depending on the moving force of the X magnetic actuator XM is hard to occur on the correction lens frame 3. Even if such a moving force occurs, the strength thereof is extremely small.

The same also applied to the movement of the correction lens frame in the Y direction. That is, when the correction lens frame 3 moves in the Y-direction, the moving force by the Y magnetic actuator YM applied to the correction lens frame 3. This moving force is applied to the position which overlaps with the X part 41x of the L-shaped guide plate 4 when viewed long the optical axis direction. Therefore, the point of action of the moving force in the Y-direction applied to the correction lens frame 3 overlaps with the portion supporting the correction lens frame in the optical axis direction. As a result, the moment of rotation depending on the moving force by the Y magnetic actuator YM is hard to occur on the correction lens frame 3. Even if such a moving force occurs, the strength thereof is extremely small.

Such a configuration makes it possible to prevent the optical axis of the correction lens frame 3 from being inclined with respect to the optical axis of the lens barrel CL when the correction lens frame 3 is moved in the X-direction and Y-direction. Accordingly, the optical axis direction of the correction lens frame 3 is maintained in the parallel state with respect to the optical axis direction of the lens barrel CL. As a result, distortion of a subject image by the correction lens frame 3 is suppressed, and the correcting effect for the image shake can be enhanced. Furthermore, since occurrence of inclination of the correction lens frame 3 is prevented, the relative movement of the correction lens frame and the base plate with respect to the L-shaped guide plate 4 is smoothed. Consequently, the size of the magnetic actuators XM and YM can be reduced by reducing the moving force produced by the magnetic actuators XM and YM.

In this embodiment, the L-shaped guide plate 4 is formed by resin molding, the processing accuracy can be enhanced in comparison with a guide member formed by bending metal wire material, and thereby it becomes possible to enhance the guiding accuracy defined when the correction lens frame 3 is guided in the X-direction and Y-direction. In particular, since the L-shaped guide plate 4 is formed in a plate-like shape having the front surface and the rear surface orthogonal to the optical axis direction, the front surface and the rear surface can be held stably. As a result, it becomes possible to guide the correction lens frame 3 while stably holding the correction lens frame 3 in the direction along the front surface and the rear surface, i.e., in the X-direction and Y-direction perpendicular to the optical axis. Thus, inclination of the correction lens frame 3 with respect to the optical axis can be prevented also from this aspect. Furthermore, in this embodiment, the reinforcement rib 44 is provided on the rear surface of the L-shaped guide plate 4, deformation of the front surface and the rear surface of the L-shaped guide plate 4 is prevented, and holding of the L-shaped guide plate 4 in the surface direction can be further enhanced.

On the other hand, by thus disposing the X magnetic actuator XM and the Y magnetic actuator YM and the L-shaped guide plate 4 to overlap with each other in the optical axis direction, it becomes possible to secure the space S where these components are not disposed as indicated by a chain line on the left area and the upper area when viewed from the front side along the optical axis of the lens barrel as shown in FIG. 13B. Therefore, it becomes possible to dispose other components constituting the image shake correction device or the lens barrel in the space S. In this embodiment, the gear box 64 for driving the locking ring 6 is disposed in the space S. Alternatively, a driving mechanism for driving a diaphragm mechanism or another mechanism provided in the lens barrel CL (not shown in FIG. 2 or 3) may be disposed in the space S. Furthermore, in this case, a driving lever or a driving rod to be disposed to extend in the optical axis direction in the inside of the lens barrel to drive the above described mechanism may be disposed to pass through the space S. As a result, the size of the image shake correction device IRD or the lens barrel can be reduced.

In this embodiment, the guide pins 43x and 43y are provided on the both surfaces of the L-shaped guide plate 4, and the guide holes 35 and 25 are opened in the correction lens frame 3 and the base plate 2; however, on the contrary, guide pins may be provided on the correction lens frame 3 and the base plate 2, and guide holes may be formed in the L-shaped guide plate 4 so that the correction lens frame 3 and the L-shaped guide plate 4 fit with respect to each other.

In the above describe embodiment, the guide member is constituted by the L-shaped guide plate; however, the guide member may be formed of wire material as in the case of the patent documents 3, 4 and 5, and a supporting member which engages with the guide member in the X direction and Y direction may be provided on the correction lens frame 3 and the base plate 2. By providing the guide member at the position overlapping with the X and Y drive actuators XCM and YM in the optical axis direction, it is possible to achieve the advantageous effects for the above described embodiment.

As described above, the image shake correction device performs the image shake correction; however, there is a case where the image shake correction property deteriorates due to, for example, aging. It is estimated that a factor of such deterioration of the image shake correction property is deterioration of the magnetic force of the drive magnets 12x and 12y.

Each of Japanese Patent Provisional Publications. No. 2008-185643A (hereafter, referred to as patent document 7), H08-211436A (hereafter, referred to as patent document 8) and H11-212134A (hereafter, referred to as patent document 9) described a voice coil type magnet actuator. However, the patent document 7 does not describe a configuration or adjusting the position of the magnet with respect to the coil. Regarding the configuration described the patent document 8, it is extremely difficult to perform position adjustment of the coil and the magnet in a state where the image shake correction device is assembled. Regarding the technique described in patent document 3, it is extremely difficult to reduce the tolerance to substantially zero if the magnet has the thickness tolerance.

In this respect, according to the embodiment, the position of the drive magnet 12x and 12y can be adjusted in a state where the image shake correction device is incorporated in the lens barrel CL or in a state where the image shake correction device IRD is removed from the lens barrel CL but the image shake correction device IRD remains in an assembled state. Specifically, in this case, the small screw 122 is loosened and the shim 123 is replaced with one having smaller thickness. Alternatively, the attached shim is simply removed. Thus, the interval between the drive magnets 12x and 12y and the drive coils 51x and 51y can be adjusted so as to cancel the deterioration of the magnetic force of the drive magnets 12x and 12y. As a result, the image shake correction property can be restored or enhanced. Needless to say, in this case, the drive magnets 12x and 12y may be replaced with new drive magnets of which magnetic forces are not deteriorated.

When the drive magnets 12x and 12y are removed from the fixing frame 1, the drive coils 51x and 51y are exposed in the opening 15 of the fixing frame 1. However, the drive coils 51x and 51y are supported from the front side by the supporting pieces 36a and 36b provided on the front surface of the correction lens frame 3. Therefore, for example, regarding the X drive coil 51x, by forcibly deforming the second supporting piece 36b toward the upper side, engagement between the X drive coil 51x and the supporting pieces 36a and 36b can be released, and thereby the X drive coil 51x can be removed from the supporting pieces 36a and 36b. The same applies to the Y drive coil 51y. By removing the intermediate plate 5 from the correction lens frame 3, it is also possible to remove the drive coils 51x and 51y from the correction lens frame 3 together with the flexible board 8 and the intermediate plate 5. Therefore, repair or replacement of the drive coils 51x and 51y are also possible, and thereby lowering of the image shake correction property due to deterioration of the drive coils 51x and 51y can also be resolved or improved.

As described above, in the image shake correction device, the position of the drive magnets 12x and 12y constituting the magnetic actuators XM and YM can be adjusted in the optical axis direction with respect to the fixing frame 1. Therefore, it is possible to manage the size of the interval between the drive magnets 12x and 12u and the drive coils 51x and 51y with a high degree of accuracy, and it is also possible to properly correct the image shake by moving the correction lens frame 3 with a desired moving force. Furthermore, position adjustment or replacement for the drive magnets 12x and 12y and the drive coils 51 and 51y can be easily performed, and therefore the image shake correction device with a high degree of accuracy can be provided.

In the above described embodiment, an magnetic actuator of a moving coil type is explained; however, the present invention may also be applied to a magnetic actuator of a moving magnet type where magnets are supported on the correction lens frame or the intermediate plate and coils are supported on the fixing frame. In such a case, the image shake correction device is configured such that the coil is attached to the fixing frame from the outside and the position of the coil in the optical axis direction can be adjusted.

By disposing the image shake correction device IRD in the lens barrel CL of the camera CAM as shown in FIG. 1, the image shake caused by the camera shake during photographing using the camera CAM can be resolved. Furthermore, by switching the lock-released state and the locked state through use of the locking ring, the image shake correction in a wide correction range can be achieved during the lock-released state, and in the locked state the correction lens frame is prevented from being accidentally moved. As a result, it becomes possible to prevent the correction lens frame being damaged, and thereby it becomes possible to realize the camera CAM which is configured compact in size and in which the image shake correction device with high reliability is incorporated.

Needless to say, the image shake correction device according to the embodiment can be provided in a lens barrel of a lens interchangeable type camera. The image shake correction device may be provided in a lens barrel of a camera body of a camera to which the lens barrel is integrally attached. The optical device in which the image shake correction device according to the embodiment is provided is not limited to a lens barrel, but may be a camera provided with the lens barrel or a camera for obtaining a still image or a moving image.

The foregoing is the explanation about the embodiment of the invention. The invention is not limited to the above described embodiment, but can be varied in various ways within the scope of the invention. For example, the invention includes a combination of embodiments explicitly described in this specification and embodiments easily realized from the above described embodiment.

This application claims priority of Japanese Patent Applications No. 2014-165916, filed on Aug. 18, 2014, No. 2014-165917, filed on Aug. 18, 2014, and No. 2014-165918, filed on Aug. 18, 2014. The entire subject matter of the applications is incorporated herein by reference.

What is claimed is:

1. An image shake correction device, comprising:
   an image correction frame configured to correct image shake by moving with respect to an optical axis;
   an actuator configured to move the image correction frame;
   a guide configured to guide movement of the image correction frame; and
   a locking ring provided rotatably about the optical axis, wherein:
   the image correction frame comprises at least one locked projection formed to protrude in an optical axis direction;
   the locking ring comprises at least one locking projection formed to protrude in the optical axis direction;
   at a predetermined rotational position of the locking ring, the at least one locking projection contacts the at least one locked projection and thereby locks the image correction frame;
   the actuator and the guide are disposed to sandwich the image correction frame in the optical axis direction; and
   the actuator and the guide are disposed to overlap with each other when viewed in the optical axis direction.

2. The image shake correction device according to claim 1, wherein the at least one locking projection and the at least one locked projection are disposed at a same position in the optical axis direction.

3. The image shake correction device according to claim 2, wherein the locking ring and the image correction frame are disposed at different positions in the optical axis direction.

4. The image shake correction device according to claim 1,
   wherein:
   when the locking ring is located at a locked position, the at least one locking projection is moved to a position where the at least one locking projection contacts the at least one locked projection and locks the image correction frame; and
   when the locking ring is at a lock-released position, the at least one locking projection is moved to a position where the at least one locking projection does not contact the at least one locked projection within a movable range of the image correction frame.

5. The image shake correction device according to claim 1,
   wherein:
   the image image correction frame and the locking ring are disposed adjacent to each other in the optical axis direction;
   the at least one locked projection is formed on a surface facing the locking ring to protrude toward the locking ring; and
   the at least one locking projection is formed on a surface facing the image image correction frame to protrude toward the image correction frame.

6. The image shake correction device according to claim 1,
wherein:
the image correction frame is movable, in a plane orthogonal to the optical axis, in a first direction and a second direction which are perpendicular to each other;
in a state where the at least one locking projection contacts the at least one locked receiving projection, movement of the image correction frame in the first direction and the second direction is restricted.

7. The image shake correction device according to claim 6,
wherein:
the at least one locking projection comprises a plurality of locking projections;
the at least one locked projection comprises a plurality of locked projections;
the plurality of locking projections restrict movement of the plurality of locked projections in a radial direction, and movement of the image correction frame in the first direction and the second direction is restricted by the plurality of locking projections.

8. The image shake correction device according to claim 7,
wherein:
the plurality of locked projections are disposed at positions in a circumferential direction along a virtual circle centered at the optical axis; and
the plurality of locking projections are formed as partial walls distributed in the circumferential direction along the virtual circle.

9. The image shake correction device according to claim 8,
wherein:
the plurality of locking projections are four locking projections and the plurality of locked projections are four locked projections; and
the four locking projections and the four locked projections are disposed at four positions in the circumferential direction in a plane orthogonal to the optical axis such that lines each of which connecting two of the four locking projections perpendicularly intersect with each other.

10. The image shake correction device according to claim 8,
further comprising:
a driver configured to drive and rotate the locking ring; and
a position detector configured to detect a rotational position of the locking ring,
wherein the rotational position of the locking ring is controlled based on the rotational position detected by the position detector.

11. The image shake correction device according to claim 1,
wherein:
the image correction frame is configured to be movable, in a plane orthogonal to the optical axis, in a first direction and a second direction which are perpendicular to each other;
the guide member is provided with a first portion elongated in the first direction and a second portion elongated in the second direction; and
the guide member is engaged with the image correction frame at the first portion to be relatively movable in the first direction with respect to the image correction frame, and is engaged with a fixed part of the image shake correction device at the second portion to be relatively movable in the second direction with respect to the fixed part.

12. The image shake correction device according to claim 11,
wherein:
the guide member includes a L-shaped plate portion having a plate thickness in the optical axis direction;
the guide member is engaged with the image correction frame on one side of the plate portion in a plate thickness direction, and is engaged with the fixed part on another side of the plate portion in the plate thickness direction.

13. The image shake correction device according to claim 1,
wherein the actuator comprises:
a first actuator configured to move the image correction frame in the first direction; and
a second actuator configured to move the image correction frame in the second direction,
wherein the first actuator and the second actuator are disposed to overlap the guide member in the optical axis direction.

14. An image shake correction device comprising:
an image correction frame configured to correct image shake by moving with respect to an optical axis; and
a locking ring provided rotatably about the optical axis;
a magnetic actuator configured to move the image correction frame,
wherein:
the image correction frame comprises at least one locked projection formed to protrude in an optical axis direction;
the locking ring comprises at least one locking projection formed to protrude in the optical axis direction;
at a predetermined rotational position of the locking ring, the at least one locking projection contacts the at least one locked projection and thereby locks the image correction frame;
the magnetic actuator comprises a magnet and a coil;
one of the magnet and the coil is supported by the image correction frame, and the other of the magnet and the coil is supported by a fixed part of the image shake correction device; and
the one of the magnet and the coil to be supported by the fixed part is attachable to the fixed part from an outside of the image shake correction device in the optical axis direction, and is position-adjustable in the optical axis direction with respect to the fixed part.

15. The image shake correction device according to claim 14,
wherein:
the image correction frame comprises two supporting pieces formed to protrude in a same direction; and
the coil is supported by the image correction frame through use of the two supporting pieces.

16. The image shake correction device according to claim 15,
wherein:
the magnetic actuator comprises a first yoke and a second yoke disposed to sandwich the magnet and the coil in the optical axis direction; and
the first yoke is integrally formed with the magnet.

17. The image shake correction device according to claim 16, wherein the first yoke is supported by the fixed part from one direction of the outside.

18. The image shake correction device according to claim 17,
wherein:
the magnet actuator further comprises at least one shim disposed to intervene between the first yoke and the fixed part; and
by changing a plate thickness of the at least one shim or by changing a number of shims to be disposed to intervene between the first yoke and the fixed part, a positional relationship between the magnet and the coil is changed.

19. An optical apparatus, comprising:
an optical system configured to form a subject image; and
an image shake correction device according to claim 1.

* * * * *